United States Patent
Hagai et al.

(10) Patent No.: US 7,298,525 B2
(45) Date of Patent: Nov. 20, 2007

(54) IMAGE PROCESSING DEVICE AND IMAGE PROCESSING PROGRAM FOR PROCESSING A PLURALITY OF COLOR SIGNALS FORMED OF A PLURALITY OF COLOR COMPONENTS

(75) Inventors: Naoki Hagai, Komaki (JP); Masashi Kuno, Ohbu (JP); Masaki Kondo, Toyoake (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 960 days.

(21) Appl. No.: 10/244,382

(22) Filed: Sep. 17, 2002

(65) Prior Publication Data

US 2003/0053098 A1    Mar. 20, 2003

(30) Foreign Application Priority Data

Sep. 18, 2001    (JP)    ............................ 2001-282601

(51) Int. Cl.
*G06F 15/00*    (2006.01)
(52) U.S. Cl. ................ 358/1.9; 358/3.16; 358/3.19; 358/3.03; 358/3.13; 358/3.22; 382/270; 382/252; 382/251; 382/266
(58) Field of Classification Search ............... 358/1.9, 358/3.16, 3.19, 3.13, 3.22, 3.03; 382/270, 382/252, 251, 266

See application file for complete search history.

(56) References Cited

U.S. PATENT DOCUMENTS

| | | | | |
|---|---|---|---|---|
| 5,387,987 A | * | 2/1995 | Ino | ........................... 358/3.03 |
| 6,089,691 A | | 7/2000 | Kakutani | ..................... 347/15 |
| 6,099,105 A | | 8/2000 | Kakutani | ..................... 347/15 |
| 6,195,468 B1 | * | 2/2001 | Yoshida | ..................... 382/270 |
| 6,215,561 B1 | * | 4/2001 | Kakutani | ................... 358/1.9 |
| 6,625,327 B1 | * | 9/2003 | Ohshima et al. | ........... 382/270 |

FOREIGN PATENT DOCUMENTS

JP    A 59-201864    11/1984

\* cited by examiner

*Primary Examiner*—Twyler Lamb
*Assistant Examiner*—Jacky X. Zheng
(74) *Attorney, Agent, or Firm*—Oliff & Berridge, PLC

(57) ABSTRACT

In a halftone module, it is judged whether or not the value "rate" for each pixel is greater than zero (0). In other words, it is judged whether or not the eight-bit input data Iin of each pixel is around a half of the relative density value for a small dot of a corresponding color. If the eight-bit input data Iin of the subject pixel is near to a half of the relative density value for a small dot, noise is added to the threshold values Ta, Tb, and Tc. The noise-added threshold values Ta', Tb', and Tc' are used in the comparing process.

30 Claims, 22 Drawing Sheets

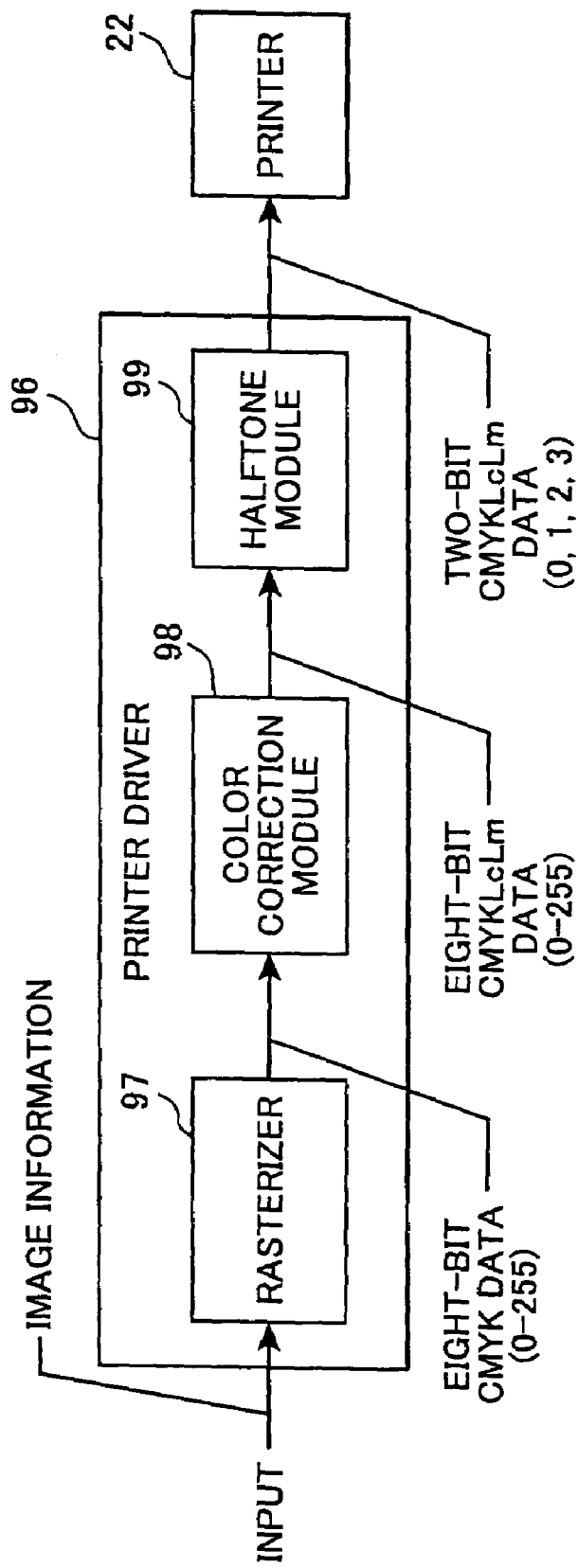

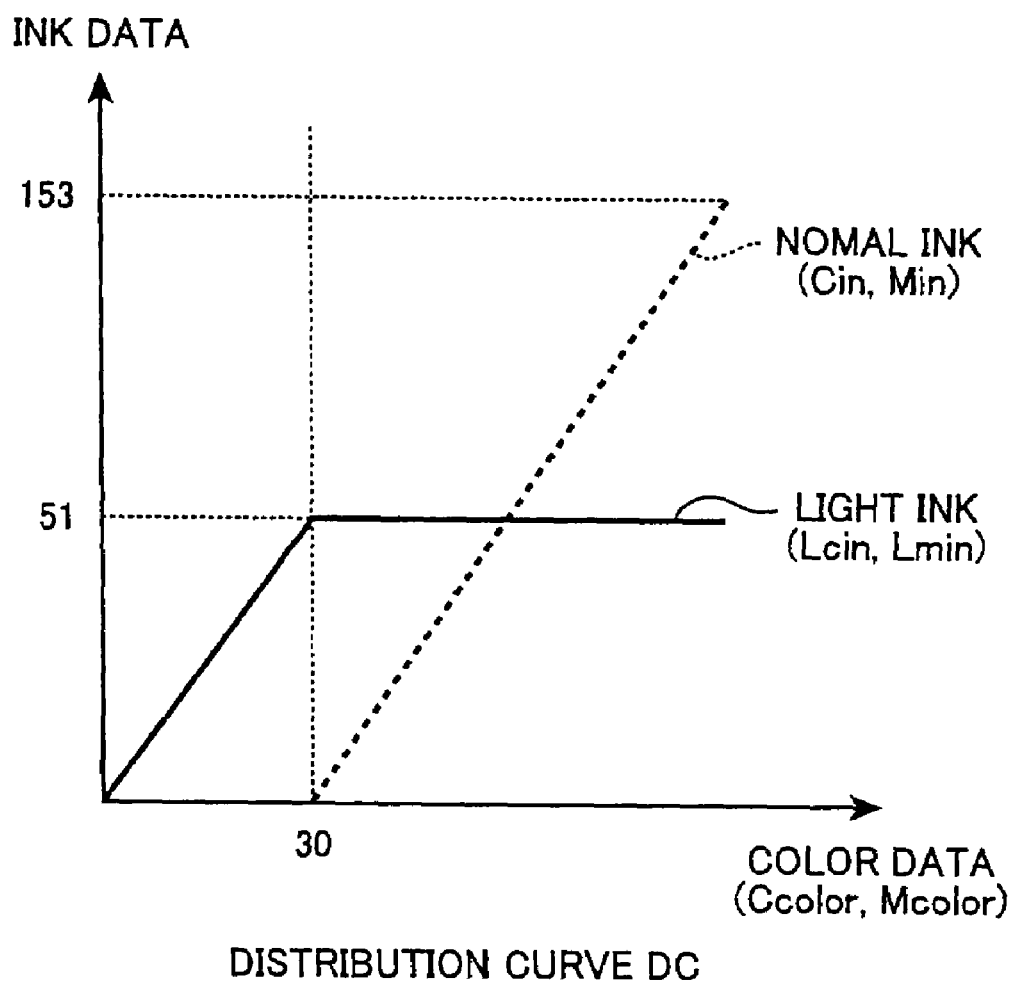

FIG.12(A)

ThT

| THRESHOLD | CYAN | MAGENTA | YELLOW | BLACK | LIGHT CYAN | LIGHT MAGENTA |
|---|---|---|---|---|---|---|
| "Tc" FOR SMALL DOT | 0 | 0 | 0 | 0 | 0 | 0 |
| "Tb" FOR MEDIUM DOT | 96 | 100 | 120 | 115 | 102 | 101 |
| "Ta" FOR LARGE DOT | 176 | 187 | 240 | 210 | 207 | 183 |

| OUTPUT DOT | CYAN | MAGENTA | YELLOW | BLACK | LIGHT CYAN | LIGHT MAGENTA |
|---|---|---|---|---|---|---|
| NONE | 0 | 0 | 0 | 0 | 0 | 0 |
| SMALL DOT | 60 | 100 | 120 | 115 | 102 | 101 |
| MEDIUM DOT | 176 | 187 | 240 | 210 | 207 | 183 |
| LARGE DOT | 255 | 255 | 255 | 255 | 255 | 255 |

FIG.12(C)

→ SCANNING DIRECTION X OF CARRIAGE

| 1/48 | 3/48 | 5/48 | 3/48 | 1/48 |
|---|---|---|---|---|
| 3/48 | 5/48 | 7/48 | 5/48 | 3/48 |
| 5/48 | 7/48 | * | | |

↓ FEEDING DIRECTION Y OF SHEET OF PAPER

DM

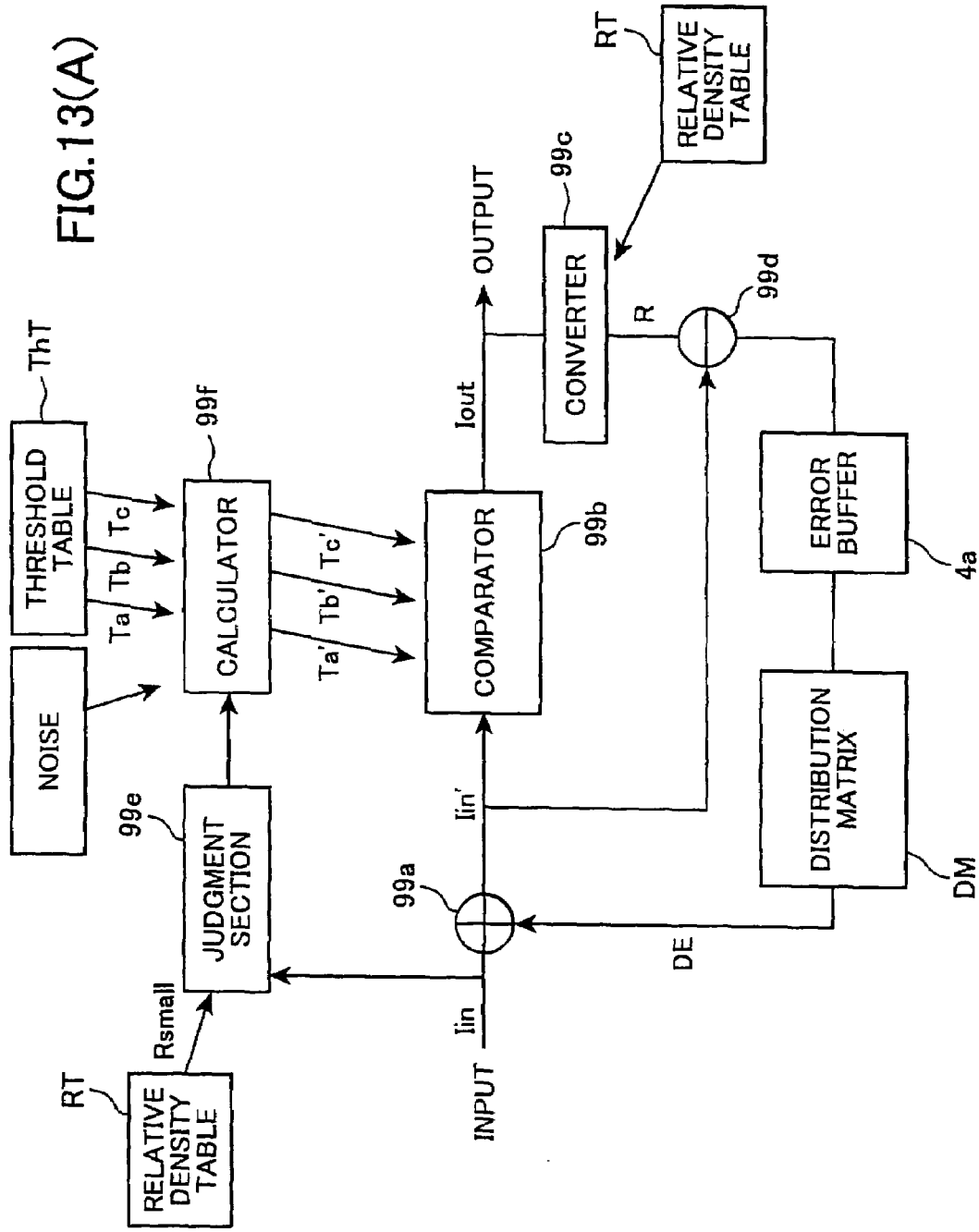

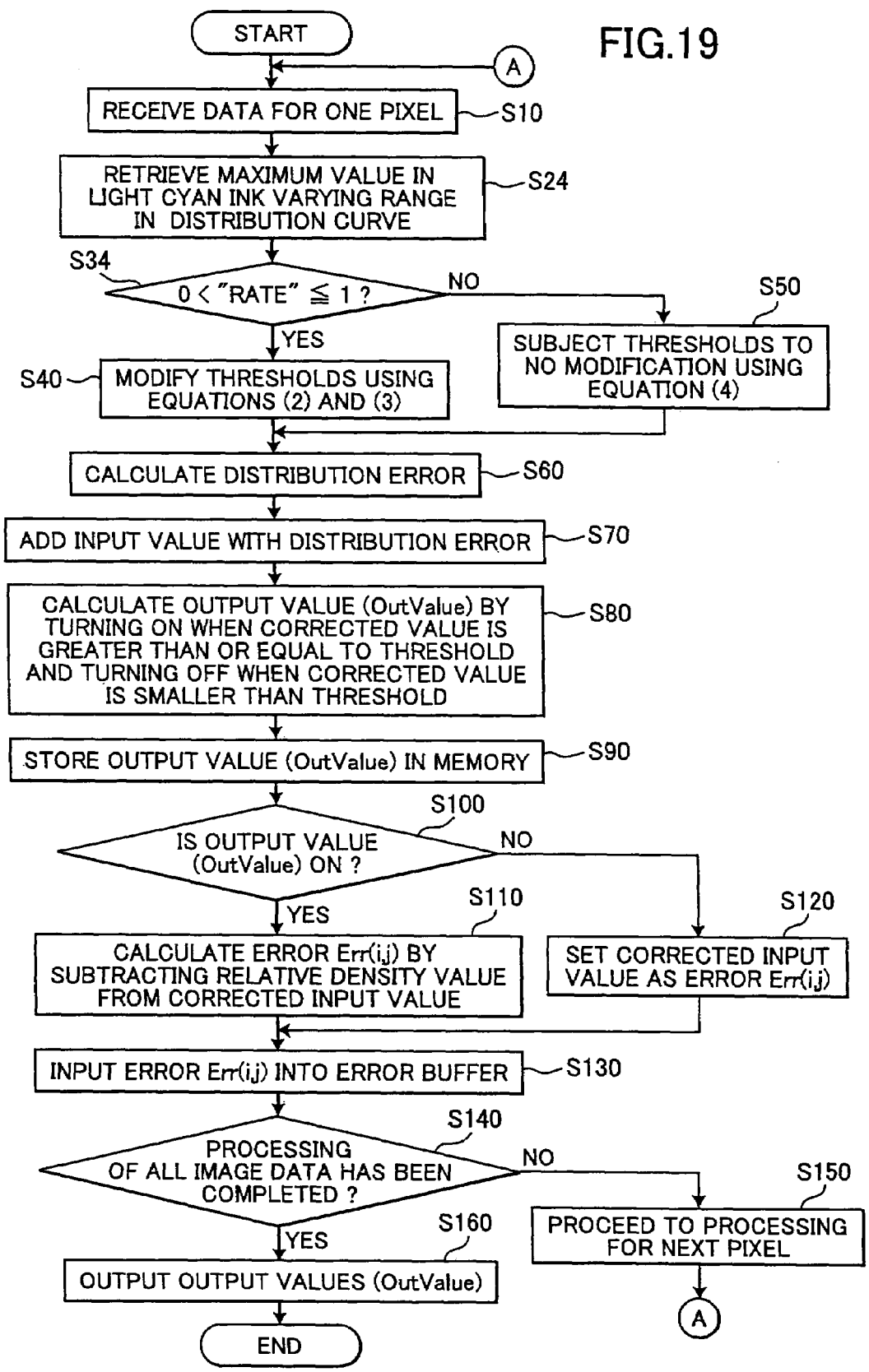

IMAGE PROCESSING DEVICE AND IMAGE PROCESSING PROGRAM FOR PROCESSING A PLURALITY OF COLOR SIGNALS FORMED OF A PLURALITY OF COLOR COMPONENTS

BACKGROUND OF THE INVENTION

1. Field of the Invention

The present invention relates to an image processing device and an image processing program for processing a plurality of color signals formed of a plurality of color components to produce image signals for a prescribed image.

2. Description of Related Art

In recent years, color printers of the type that eject multiple colors of ink from the print head, commonly known as inkjet printers, have become widely popularized as a computer output device. These inkjet printers are widely used to print images that have been processed by a computer or the like in multiple colors and multiple gradations. Gradations corresponding to inputted density data are rendered by controlling the rate of dot generation within a particular region.

One method based on this line of thinking is called a bi-level error-diffusion halftone method. This method controls the generation of dots for each pixel such that the density error generated over the entire image is drastically reduced. To accomplish this, error generated at each pixel caused by a disparity between the intended tone represented by the inputted density data and the actual density represented by the existence of dots is spread to neighboring unprocessed pixels. In this method, whether or not to form a dot at each pixel is determined based on correction data that incorporates the error diffused in the inputted density data.

In recent years, various technologies other than the error-diffusion method have been proposed for enhancing the gradient depiction of inkjet printers. One such technology is a printing device and method employing light and dark ink, such as those disclosed in U.S. Pat. Nos. 6,089,691 and 6,099,105. This printing device uses high- and low-density inks for the same colors and controls the ejection of both shades of ink to achieve excellent gradation in the printing process.

Another printing device described in Japanese Unexamined Patent Application Publication No. SHO-59-201864 has been proposed as a method for rendering multiple gradations. This device can vary the density per unit surface area in multiple gradations by forming two types of dots differing in ink concentration and dot diameter. This printing device forms one pixel using four dots and is capable of printing images in multiple levels of density by varying the generated frequency of high- and low-density dots within each pixel.

Both of the methods proposed in the U.S. Pat. Nos. 6,089,691 and 6,099,105 and in the Japanese Unexamined Patent Application Publication No. SHO-59-201864 render multiple tones of each color hue not by bi-level method of specifying whether each color dot is on or off, but by a three-level or multi-level method using light and dark dots (variable-density dots).

FIG. 1 is a block diagram showing an outline of the processes in the conventional bi-level error-diffusion halftone method. In this conventional method, an output value Iout is a binary number indicating whether a dot is to be outputted or not. When an input value Iin for one pixel is inputted, values are read from an error buffer 109. The values are errors, which have been obtained at pixels that have been processed previously and that are located near to the subject pixel. A distribution matrix 103 is used to calculate the amount of the portion of the errors, which should be diffused to the present pixel. A corrected input value Iin' is obtained by adding the portion of the errors to the input value Iin. A comparator 107 compares the corrected input value Iin' to a threshold read from a threshold memory 105. A dot is outputted when the corrected input value Iin' is larger than the threshold and not outputted when the corrected input value Iin' is smaller than the threshold. Next a converter 102 converts the value to 255 when a dot is outputted and to 0 when a dot is not outputted. Next, the difference between the corrected input value Iin' and the determined value 255 or 0 is stored in the error buffer 109. Because this error diffusion method determines only two levels of gradation per pixel, this method is referred to as a bi-level error-diffusion halftone process.

FIG. 2 is a block diagram showing an overview of processes performed in a multilevel error-diffusion halftone method that determines three or more levels of gradations per pixel by using an error-diffusion process. The multilevel error-diffusion halftone method is employed when a printer used has n levels of gradation per pixel, where n is an integer greater than or equal to three (3). The method shown in this block diagram is for determining four levels per pixel. In order from the level of greatest density, these four levels include large dots, medium dots, small dots, and non-dots. Accordingly, the output Iout obtained by this method will be one of four values: that is, values indicative of "output large dot", "output medium dot", "output small dot", and "output no dot".

As shown in FIG. 2, the multilevel error-diffusion halftone method is different from the bi-level error-diffusion halftone method in the two points described below:

First, the threshold memory 105 stores therein three thresholds Ta, Tb, and Tc (where Ta>Tb>Tc).

Secondly, a relative density table 112 is additionally provided. The relative density table 112 stores therein four different relative density values in correspondence with the four different values of outputs Iout (values indicative of "output large dot", "Output medium dot", "output small dot", and "output no dot").

When the input value Iin for one pixel is inputted, the error value's, obtained at the previously processed pixels, are read from the error buffer 109, and the distribution matrix 103 is used to calculate the error for the present pixel. A corrected input value Iin' is then obtained by adding the error to the input value Iin. The comparator 107 compares the corrected input value Iin' to each of the three thresholds Ta, Tb, and Tc, which are read from the threshold memory 105. When comparing the corrected input value Iin' to the three thresholds Ta, Th, Tc, the comparator 107 outputs: an output value Iout indicative of "output large dot" when the corrected input value Iin' is greater than the threshold Ta; an output value Iout indicative of "output medium dot" when the corrected input value Iin' is greater than threshold Tb but smaller than threshold Ta; an output value Iout indicative of "output small dot" when the corrected input value Iin' is greater than threshold Tc but smaller than threshold Tb; and an output value Iout indicative of "output no dot" when the corrected input value Iin' is smaller than threshold Tc. Next, the converter 102 selects one relative value from the relative value table 112, based on whether the output is a large dot, medium dot, small dot, or no dot. The converter 102 then converts the output value Iout into the selected relative value R. The difference between the corrected input value Iin' and the relative value R is recorded in the error buffer 109 as an error for the present pixel.

SUMMARY OF THE INVENTION

It is noted that if a six-ink printer having the inks of C: cyan (normal cyan), M: magenta (normal magenta), Y: yellow, K: black, Lc: light cyan, and Lm: light magenta is used, a color correction process has to be executed before the multilevel error diffusion halftone process is executed. The color correction process is for converting original CMYK color data ($C_{color}$ (cyan), $M_{color}$ (magenta), $Y_{color}$ (yellow), $K_{color}$ (black)) into CMYKLcLm six-ink data ($C_{in}$ (normal cyan), $M_{in}$ (normal magenta), $Y_{in}$ (yellow), $K_{in}$ (black), $Lc_{in}$, (light cyan), $Lm_{in}$ (light magenta)). The multilevel error-diffusion halftone process receives data $C_{in}$, $M_{in}$, $Y_{in}$, $K_{in}$, $Lc_{in}$, or $Lm_{in}$ as the input value Iin, and converts the data into two-bit CMYKLcLm six-ink data ($C_{out}$, $M_{out}$, $Y_{out}$, $K_{out}$, $Lc_{out}$, or $Lm_{out}$) as the output value Iout.

It is noted that normal cyan has the same color as the light cyan, but has darker or greater density than the light cyan. Similarly, normal magenta has the same color as the light magenta, but has darker or greater density than the light magenta.

During the color correction process, in order to convert the cyan color data $C_{color}$ into normal cyan ink data $C_{in}$ and light cyan ink data $Lc_{in}$, the color correction process employs a distribution curve DC as shown in FIG. 3(A), wherein the dotted line is for normal ink and the solid line is for light ink. Similarly, in order to convert the magenta color data $M_{color}$ into normal magenta ink data $M_{in}$ and light magenta ink data $Lm_{in}$, the color correction process employs another distribution curve DC similar to as shown in FIG. 3(A). The thus obtained ink data ($C_{in}$, $M_{in}$, $Lc_{in}$, or $Lm_{in}$) is subjected, as the input value Iin, to the multilevel error-diffusion halftone process. It is noted that a distribution curve DC of another type shown in FIG. 3(B) can be used to convert each of cyan and magenta color data into normal ink data and light ink data.

Compared to other methods for controlling dot formation, the bi-level error-diffusion halftone method of FIG. 1 is superior as a bi-level method in greatly reducing errors in the overall image and improving image quality.

When performing the multilevel error-diffusion halftone method, however, a problem known as false contours occurs in images having continuous-tone sections.

Especially, when using the six-color printer, the cyan and magenta colors use both a normal (dark) ink and a light ink. False contours occur when switching between these two shades, and results in degraded image quality.

In view of the foregoing, it is an object of the present invention to provide an improved image processing device and image processing program capable of rapidly and effectively preventing such false contours.

In order to solve this and other objects, the present invention provides an image processing device, comprising: an inputting portion receiving input data indicative of a density value of one color component for one pixel in a desired image; a judging unit judging whether or not the density value of the input data is near to a reference value; a threshold storing portion previously storing therein a predetermined threshold; a noise adding portion adding a noise to either one of the density value of the input data and the threshold when it is judged that the density value of the input data is near to the reference value; a correcting portion correcting the input data by a correction amount that is determined dependently on an error value which is determined at at least one pixel that has been already-processed and that is located near to the subject pixel, thereby converting the input data into corrected data; a comparing portion comparing the corrected data with the threshold; an outputting portion outputting output data based on the compared results, thereby converting the corrected data into the output data; a relative density setting portion setting a relative density value that corresponds to the output data; and an error calculating portion calculating an error value for the subject pixel based on a difference between the corrected data and the relative density value.

According to another aspect, the present invention provides an image processing device for producing image signals indicative of a desired image by processing a plurality of color signals for a plurality of color components, the image processing device comprising: a storage device storing a plurality of relative values in correspondence with a plurality of different parameters; an input device receiving, as a color signal, an input value indicative of color density at one color component for one pixel constituting a desired image; an extracting portion extracting one relative value from the relative value storage device based on a parameter that corresponds to the input value; a judging portion judging whether or not the input value is near to a one-half of the extracted relative value; an adding portion adding a noise signal to either one of the input value and a threshold when the input value is near to the one-half of the extracted relative value; and a converting portion converting the input value into an output value by comparing the input value with the threshold, and outputting the output value as an image signal.

According to a further aspect, the present invention provides an image processing device for producing image signals indicative of a desired image by processing a plurality of color signals for a plurality of color components, the image processing device comprising: an input portion receiving an input value of a first color component of a desired image and an input value of a second color component of the desired image; a judging portion performing at least one of: a first judging operation judging whether or not the input value of the first color component indicates a density level near to a predetermined mixing-start-point density level where the first color component starts being mixed with the second color component, and a second judging operation judging whether or not the input value of the second color component indicates a density level near to the predetermined mixing-start-point density level; an adding portion performing a first noise-adding operation when the judging portion determines that the input value of the first color component indicates a density level near to the predetermined mixing-start-point density level and performing a second noise-adding operation when the judging portion determines that the input value of the second color component indicates a density level near to the predetermined mixing-start-point density level, the first noise-adding operation being for adding a first noise signal to either one of a threshold for the first color component and the input value for the first color component, the second noise-adding operation being for adding a second noise signal to either one of a threshold for the second color component and the input value for the second color component; and a converting portion comparing the input value of the first color component with the corresponding threshold, thereby converting the input value of the first color component into an output value of the first color component, and comparing the input value of the second color component with the corresponding threshold, thereby converting the input value of the second color component into an output value of the second color component.

According to still another aspect, the present invention provides an image processing device for producing image signals indicative of a desired image by processing a plurality of color signals for a plurality of color components, the image processing device comprising: an input portion receiving an input value of a first color component of a desired image; a judging portion judging whether or not the input value of the first color component indicates a density level around a predetermined uniform density level, at which the input value of the first color component becomes approximately uniform; an adding portion adding a first noise signal to either one of the input value of the first color component and a threshold for the input value of the first color component when the judging portion determines that the input value of the first color component indicates a density level near to the predetermined uniform density level; and a converting portion comparing the input value of the first color component with the threshold, thereby converting the input value of the first color component into an output value of the first color component.

According to another aspect, the present invention provides an image processing device for producing image signals indicative of a desired image by processing a plurality of color signals for a plurality of color components, the image processing device comprising: an input portion receiving an input value of a first color component of a desired image and an input value of a second color component of the desired image; a judging portion judging whether or not the input value of the second color component indicates that the input value of the first color component has a density level around a predetermined uniform density level, at which the input value of the first color component becomes approximately uniform; an adding portion adding a second noise signal to either one of the input value of the second color component and a threshold for the input value of the second color component when the judging portion determines that the input value of the second color component indicates that the input value of the first color component has the density level near to the predetermined uniform density level; and a converting portion comparing the input value of the second color component with the corresponding threshold, thereby converting the input value of the second color component into an output value of the second color component.

According to another aspect, the present invention provides a program for being executed by a computer to process an image, the program comprising: a program of receiving input data indicative of a density value of one color component for one pixel in a desired image; a program of judging whether or not the density value of the input data is near to a reference value; a program of adding a noise to either one of the density value of the input data and a threshold when it is judged that the density value of the input data is near to the reference value; a program of correcting the input data by a correction amount that is determined dependently on an error value which is determined at at least one pixel that has been already-processed and that is located near to the subject pixel, thereby converting the input data into corrected data; a program of comparing the corrected data with the threshold; a program of outputting output data based on the compared results, thereby converting the corrected data into the output data; a program of setting a relative density value that corresponds to the output data; and a program of calculating an error value for the subject pixel based on a difference between the corrected data and the relative density value.

BRIEF DESCRIPTION OF THE DRAWINGS

The above and other objects, features and advantages of the invention will become more apparent from reading the following description of the preferred embodiments taken in connection with the accompanying drawings in which:

FIG. 10 is an explanatory view illustrating an operation of a printer driver in the personal computer of FIG. 4;

FIG. 11 is an explanatory diagram showing an example of a distribution curve DC used to convert each of cyan and magenta color components into light ink and normal ink according to the embodiment;

FIG. 12(A) is an explanatory diagram showing an example of a threshold table Th used in the multilevel error-diffusion halftone process of the present embodiment;

FIG. 12(B) is an explanatory diagram showing an example of a relative density table RT used in the multilevel error-diffusion halftone process of the present embodiment;

FIG. 12(C) is an explanatory diagram showing an example of a distribution matrix, used in the multilevel error-diffusion halftone process of the present embodiment;

FIG. 13(A) is a functional block diagram showing the multilevel error-diffusion halftone process according to the first embodiment;

FIG. 19 is a flowchart illustrating the error-diffusion multilevel halftone process according to a first modification of the second embodiment.

DETAILED DESCRIPTION OF THE PREFERRED EMBODIMENTS

An image processing device according to preferred embodiments of the present invention will be described while referring to the accompanying drawings.

First Embodiment

Figure 4:
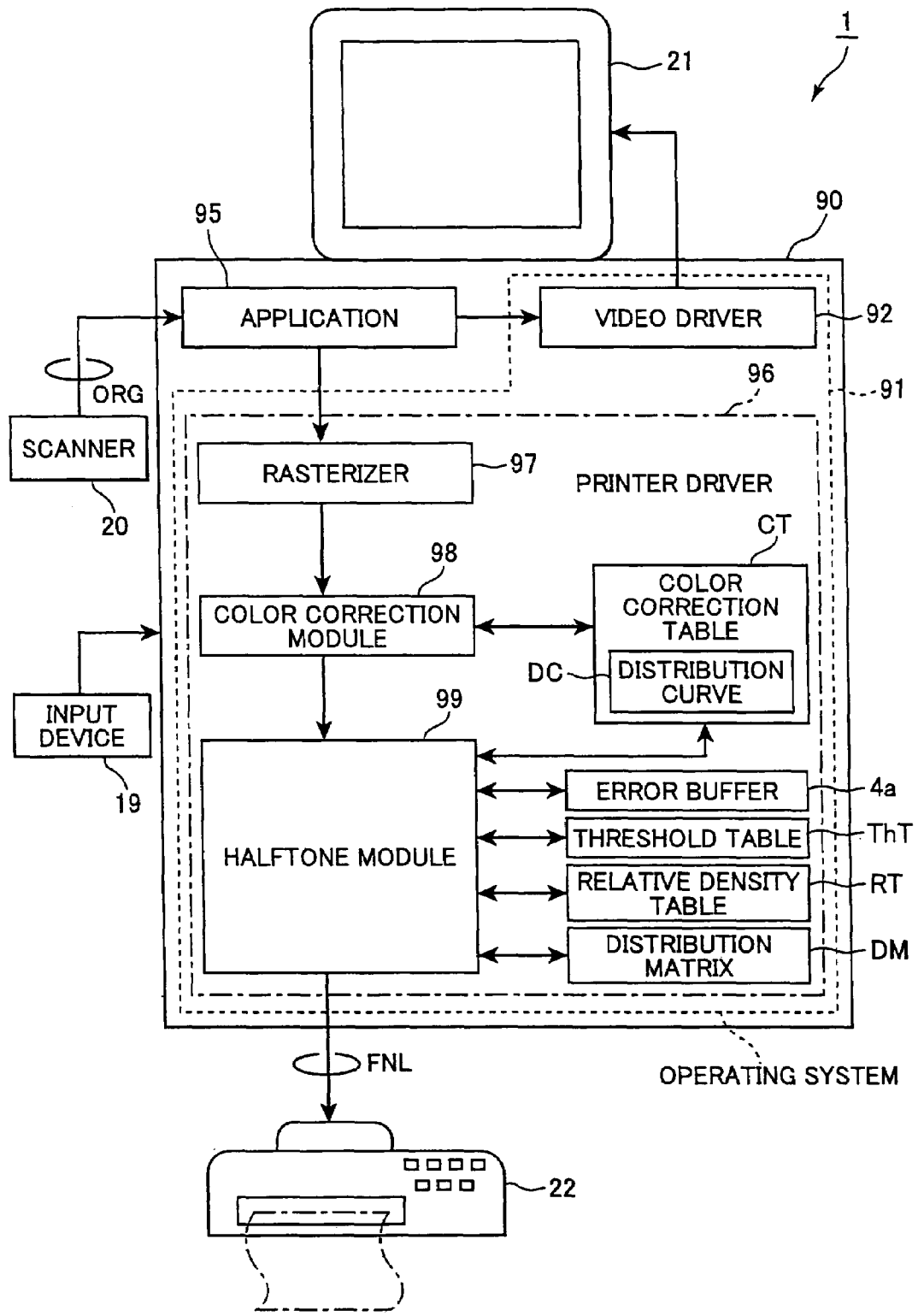
FIG. 4 is a block diagram showing the general configuration of an image processing system employing a personal computer as an image processing device according to a first embodiment of the present invention.

FIG. 4 shows the configuration of an image processing system 1 according to a first embodiment of the present invention. The image processing system 1 is constructed from: a personal computer 90, which is the image processing device of the present embodiment; and a color printer 22 which is an image forming device outputting an image processed by the personal computer 90.

As shown in FIG. 4, the image forming system 1 includes the personal computer 90 and, provided external to the personal computer 90, a scanner 20, the color printer 22, a color display 21, and an input device 19 such as a keyboard, mouse, and the like.

The external scanner 20 reads color image data from an original color print and supplies original color image data ORG to the personal computer 90. The original color image data ORG includes three color components: red (R), green (G), and blue (B).

When desiring to print images, the personal computer 90 generates, based on the original color image data ORG or the like, two-bit CMYKLcLm output data ($C_{out}$, $M_{out}$, $Y_{out}$, $K_{out}$, $Lc_{out}$, $Lm_{out}$) required for printing, and supplies the CMYKLcLm output data as final color image data FNL to the color printer 22 so that the color printer 22 records the image data on a recording paper.

First, the general construction of the printer 22 will be described with reference to FIG. 5.

Figure 5:
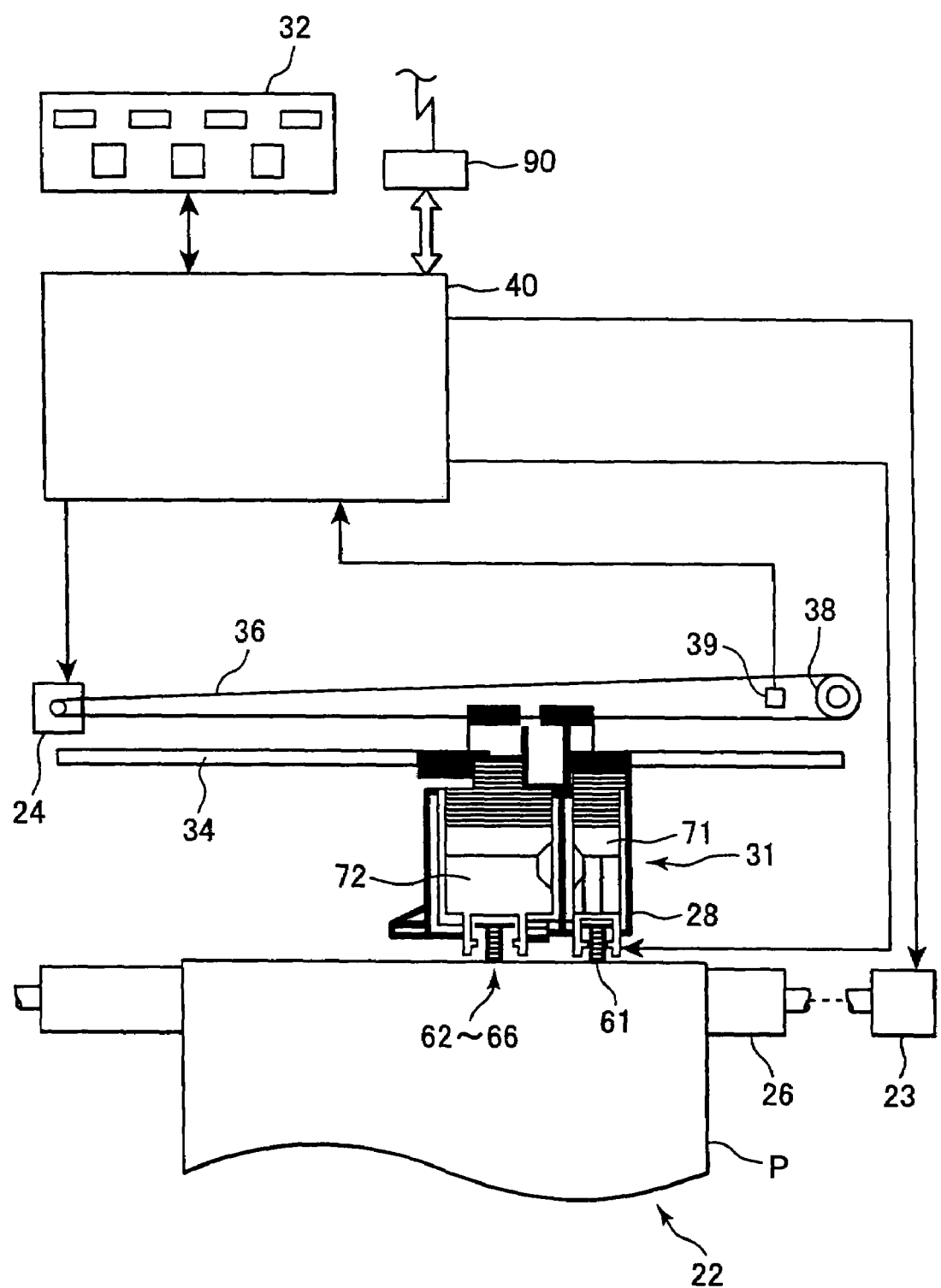
FIG. 5 shows the general construction of a printer provided in the image processing system of FIG. 4.

As shown in FIG. 5, the printer 22 includes: a carriage 31, a platen 26, a carriage motor 24 for is reciprocally moving the carriage 31 along the axial direction of the platen 26, a print head 28 mounted on the carriage 31, a mechanism (not shown) for driving the print head 28 and controlling ink ejection from the print head 28 to form dots, a paper feed motor 23, a control panel 32, and a control circuit 40 for controlling the exchange of signals between the control panel 32 and the paper feed motor 23, carriage motor 24, and print head 28.

Figure 6A:
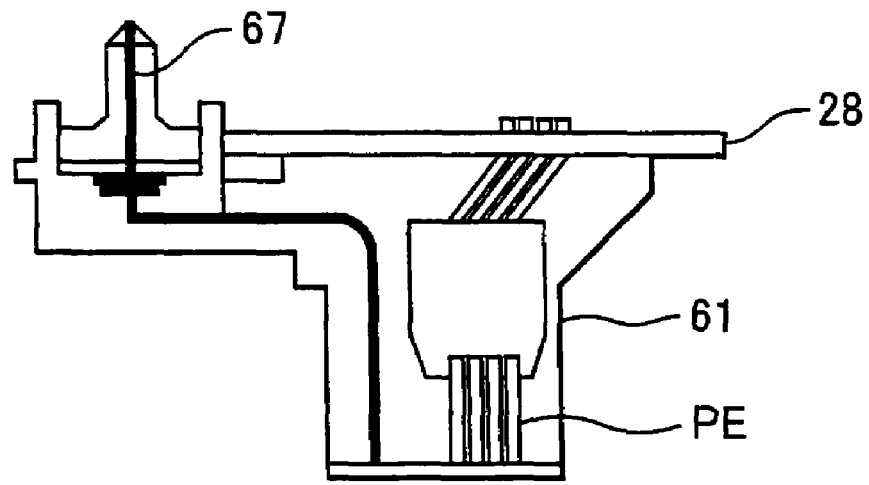
FIG. 6(A) is an explanatory diagram showing the general internal structure of an inkjet print head provided in the printer of FIG. 5.

A black ink cartridge 71 for black ink (K) and a color ink cartridge 72 for storing five ink colors, including normal cyan (C), normal magenta (M), yellow (Y), light cyan (Lc), and light magenta (Lm) are mounted in the carriage 31 of the printer 22. A total of six ink ejection heads 61 through 66 are formed in the print head 28 on the bottom of the carriage 31. As shown in FIG. 6(A), a guiding tube 67 is formed on the bottom of the carriage 31 for guiding ink from each ink tank to the corresponding ink ejection head. When the black ink cartridge 71 and the color ink cartridge 72 are mounted on top of the carriage 31, each guiding tube 67 is inserted through a connecting hole provided in each cartridge, allowing ink to be supplied from each ink cartridge to the ink ejection heads 61 through 66.

Figure 6B:
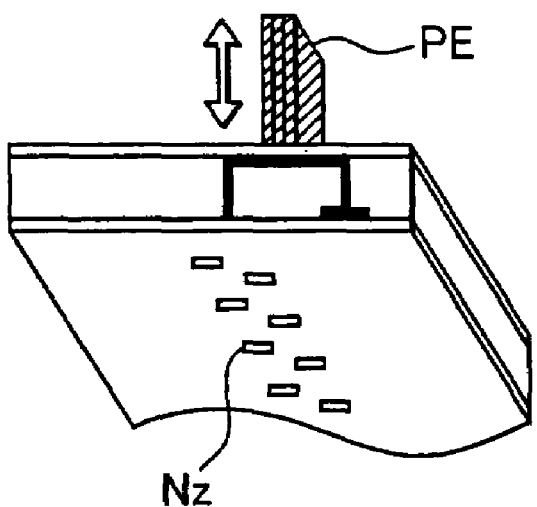
FIG. 6(B) is an explanatory diagram showing nozzles formed on the inkjet print head.

Here, the mechanism for ejecting ink will be briefly described. FIGS. 6(A) and 6(B) are explanatory diagrams showing the general internal structure of the print head 28. When the black ink cartridge 71 and the color ink cartridges 72 are mounted on the carriage 31, ink is drawn out of the ink cartridges by the capillary effect, as shown in FIG. 6(A), and introduced into the ink ejection heads 61 through 66 of the print head 29 provided on the bottom of the carriage 31. It is noted that when the ink cartridge is first mounted on the carriage 31, a special pump device performs an operation to draw ink into each of the ink ejection heads 61 through 66.

Figure 7A:
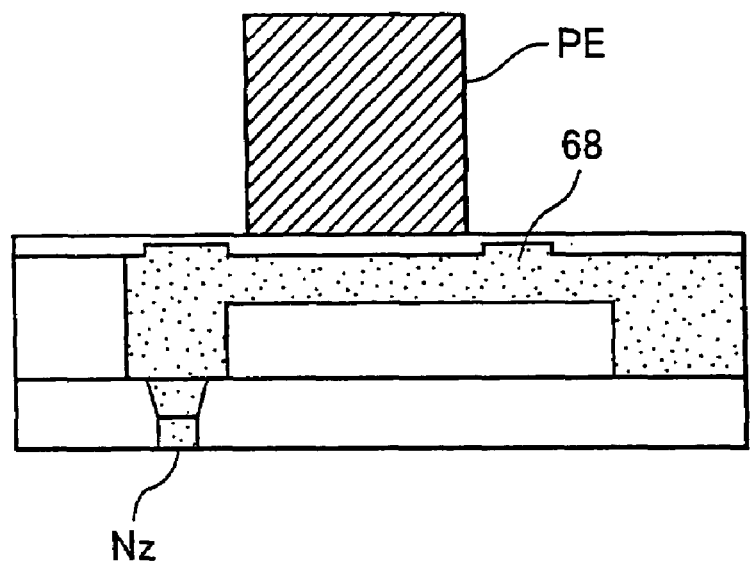
FIG. 7(A) is an explanatory diagram showing the construction of a piezoelectric element PE and a nozzle Nz provided in the inkjet print head of FIG. 6(B)
Figure 7B:
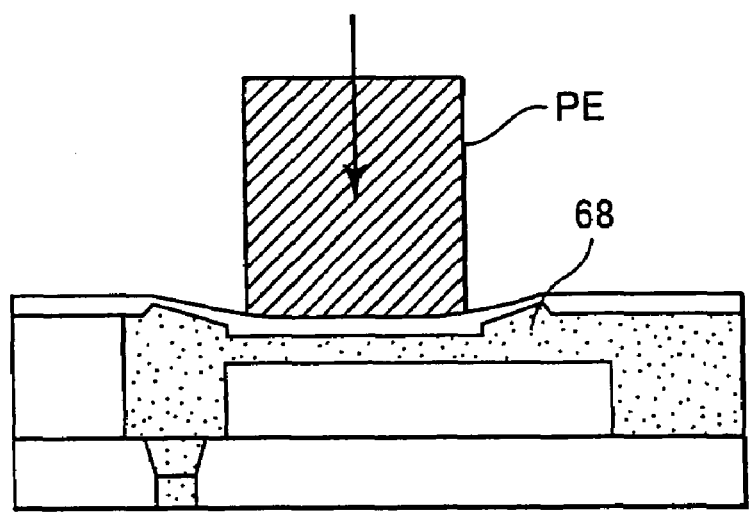
FIG. 7(B) shows how the piezoelectric element FE is actuated to eject an ink particle through the nozzle Nz.

As shown in FIG. 6(B), 32 nozzles Nz are provided on each of the ink ejection heads 61 through 66. Highly responsive piezoelectric elements PE are disposed one on each nozzle as an electrostrictive element. FIG. 7(A) shows a detailed configuration of the piezoelectric element PE and the nozzle Nz. As shown in FIG. 7(A), each piezoelectric element PE is disposed adjacent to an ink channel 68 provided for guiding ink to the nozzle Nz. As is well known in the art, the piezoelectric element PE is a device capable of converting electricity to mechanical energy at an extremely high speed wherein a crystalline structure is deformed when a voltage is applied to the element. In the present embodiment, a voltage is applied across electrodes provided on either side of the piezoelectric element PE for a prescribed time interval, causing the element to expand only while the voltage is being applied. The expanded piezoelectric element PE deforms one side wall of the ink channel 68, as shown in FIG. 7(B). As a result, the capacity or volume of the ink channel 68 is constricted by the expansion of the piezoelectric element PE, and ink corresponding to the constricted portion becomes an ink particle Ip and is ejected at a high rate of speed via the end of the nozzle Nz. Printing is achieved by these ink particles Ip to form dots by permeating a paper P mounted on the platen 26.

According to the present embodiment, the piezoelectric element PE attains four levels of gradation for one dot. In order from the level of greatest density, these four levels include large dots, medium dots, small dots, and non-dots. The piezoelectric element PE is controlled to eject: a small droplet with a droplet amount of 6 pl for a small dot, a medium droplet with a droplet amount of 10 pl for a medium dot, and a large droplet with a droplet amount of 20 pl for a large dot.

With the printer 22 having the hardware construction described above, the carriage motor 24 moves the carriage 31 reciprocally (that is, in the main scanning direction X), while the paper feed motor 23 rotates the platen 26 and other rollers to convey the paper P in the sub scanning direction Y. At the same time the printer 22 drives the piezoelectric elements PE for each of the ink ejection heads 61 through 66 on the print head 28 to eject each color of ink, forming dots on the paper P that combine to form multicolor images.

The mechanism for conveying the paper P includes a gear train (not shown) for transferring the rotations of the paper feed motor 23 not only to the platen 26, but also to paper conveying rollers. The mechanism for reciprocally moving the carriage 31 includes: a sliding shaft 34 that supports the carriage 31 parallel to the axis of the platen 26 such that the carriage 31 can slide along the sliding shaft 34; a pulley 38 disposed near the opposite end of the sliding shaft 34 from the carriage motor 24; an endless drive belt 36 stretched between the carriage motor 24 and pulley 38; a positional sensor 39 for detecting the origin position of the carriage 31; and the like.

Next, the internal structure of the control circuit 40 will be described.

Figure 8:
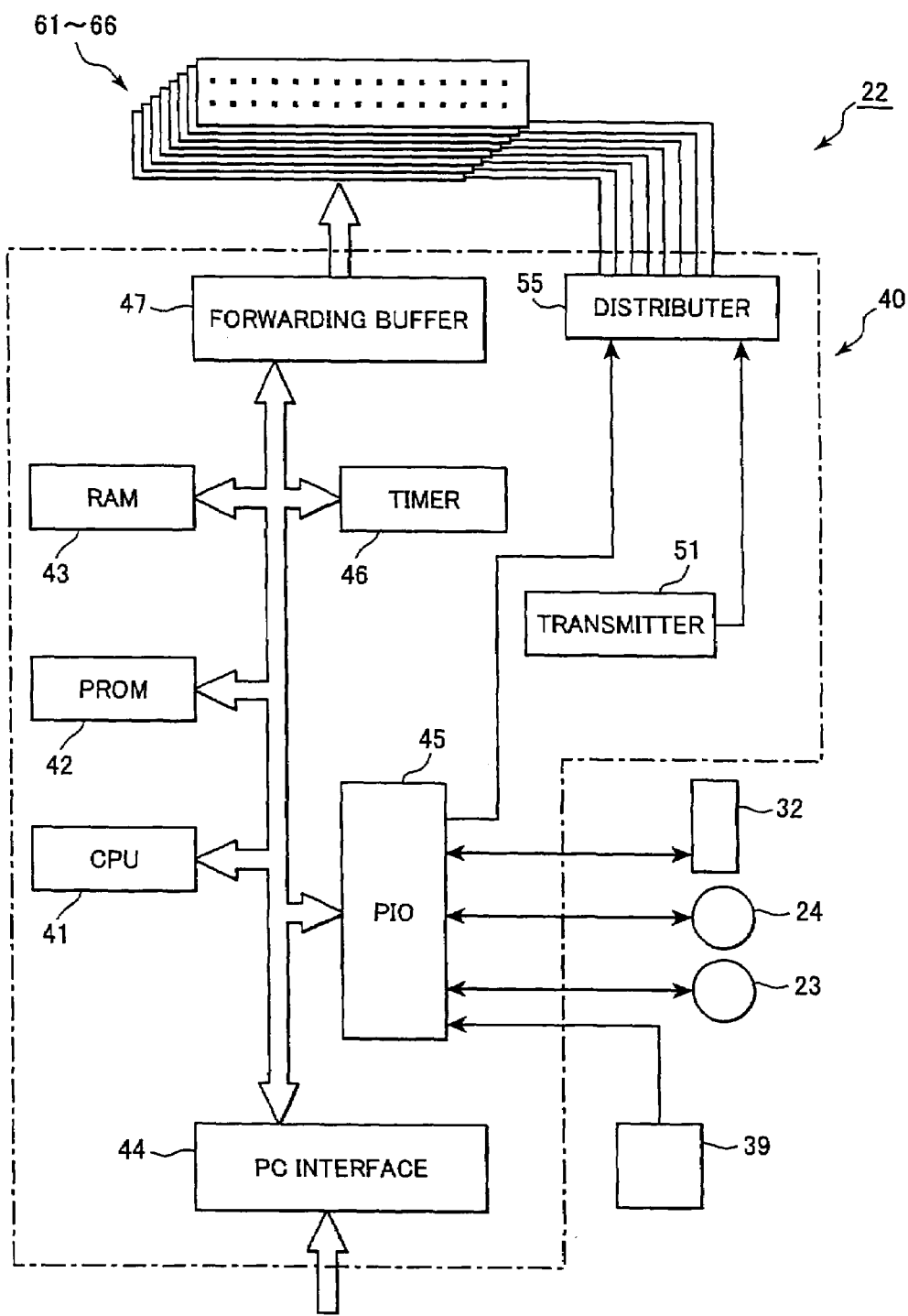
FIG. 8 is a block diagram showing the internal construction of a control circuit in the printer of FIG. 5.

FIG. 8 is an explanatory diagram showing the internal construction of the control circuit 40.

As shown in FIG. 8, the control circuit 40 includes: a CPU 41; a PROM 42; a RAM 43; a computer interface 44 for exchanging data with the personal computer 90; a peripheral I/O unit 45 for exchanging signals with the paper feed motor 23, carriage motor 24, control panel 32, positional sensor 39 and the like; a timer 46; a forwarding buffer 47 for is outputting a dot on/off signal (two-bit CMYKLcLm output data) to the ink ejection heads 61 through 66; and the like. The above elements and circuits are connected to one another via a bus. The control circuit 40 also includes a transmitter 51 for outputting driving waves at a prescribed frequency and a distributor 55 for distributing output from the transmitter 51 to the ink ejection heads 61 through 66 at a prescribed timing.

After receiving the two-bit CMYKLcLm output data processed by the personal computer 90, the control circuit 40 stores the two-bit CMYKLcLm output data temporarily in the RAM 43, and subsequently outputs the two-bit CMYKLcLm output data to the forwarding buffer 47 at a prescribed timing.

Next, the personal computer 90, which serves as the image processing device of the present embodiment, will be described.

Figure 9:
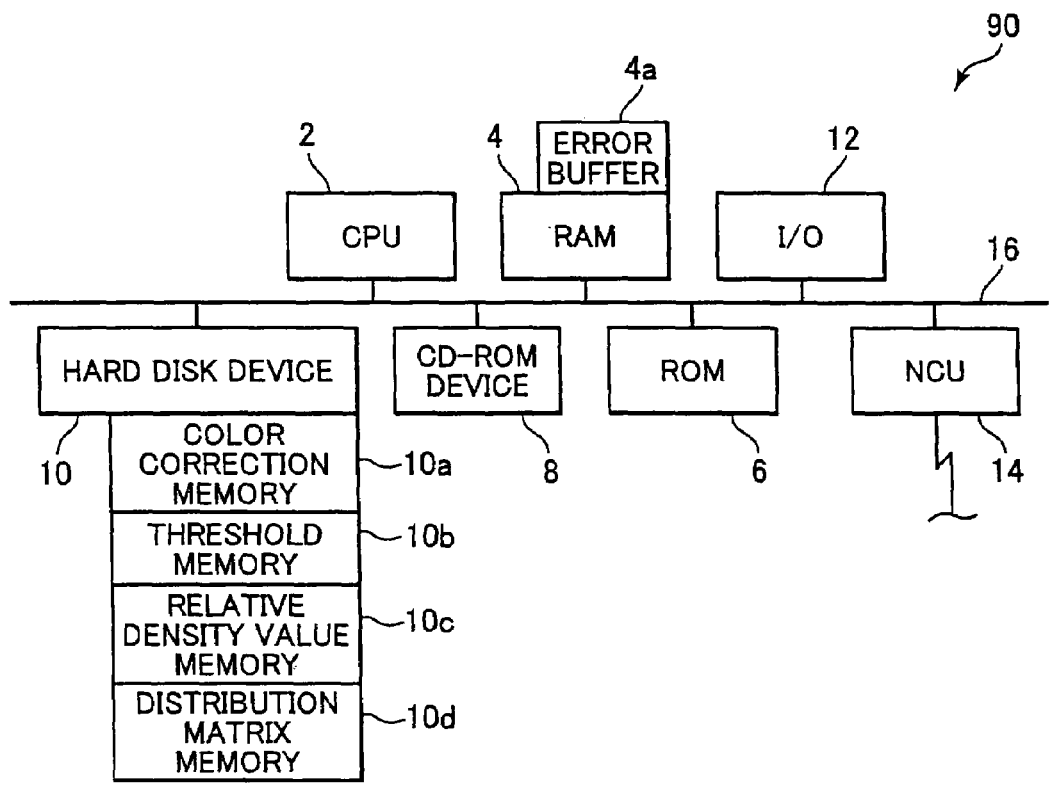
FIG. 9 is a block diagram showing the internal construction of the personal computer of FIG. 4.

As shown in FIG. 9, the personal computer 90 is internally provided with a CPU 2, a RAM 4, a ROM 6, a CD-ROM device 8, a hard disk device 10, an input/output interface (I/O) 12, and a network control unit 14, all of which are connected with one another via a bus 16.

The input/output interface 12 is connected to the scanner 20, the input device 19, the color display 21, and the color printer 22 (FIG. 4).

The network control unit 14 is connected to a predetermined network such as the Internet.

The hard disk device 10 previously stores therein data of an operating system program 91, an application program 95, a video driver program 92, and a printer driver program 96 (FIG. 4). It is noted that the data of the programs 91, 92, 95, and 96 may be stored originally in a CD-ROM and read via the CD-ROM device 8 into the hard disk device 10. Or, the data of the programs 91, 92, 95, and 96 may be transferred from the Internet via the NCU 14 into the hard disk device 10. The hard disk device 10 also stores therein: a color correction memory 10a, a threshold memory 10b, a relative density value memory 10c, and a distribution matrix memory 10d. As will be described later, the color correction memory 10a stores therein a color correction table CT (FIG. 4). The color correction table CT contains a distribution curve DC (FIG. 11). The threshold memory 10b stores therein a threshold table ThT (FIG. 12(A)). The relative density value memory 10c stores therein a plurality of relative density tables RT (FIG. 12(B)). The distribution matrix memory 10d stores therein a distribution matrix DM (FIG. 12(C)).

The ROM 6 previously stores therein various data. The ROM 6 may store therein data of the programs 91, 92, 95, and 96, the color correction memory 10a, the threshold memory 10b, the relative density value memory 10c, and the distribution matrix memory 10d.

The RAM 4 is used for temporarily storing various types of data. As will be described later, an error buffer 4a is prepared in the RAM 4.

The CPU 2 is for controlling the entire device of the personal computer 90. The CPU 2 executes the programs 91, 92, 95, and 96, whose data is read into the RAM 4 from the hard disk device 10.

As shown in FIG. 4, the application program 95 operates under the operating system 91. The video driver 92 and the printer driver 96 are integrated with the operating system 91. The application program 95 is used to perform image retouching or the like, and reads an image from the external scanner 20 and displays this image on the color display 21 via the video driver 92 while performing various processes on the image.

When the application program 95 issues a print command, the printer driver 96 receives image data from the application program 95, and converts the image data into two-bit CMYKLcLM signals (final color image data FNL) that can be printed by the printer 22.

As shown in FIG. 4, the printer driver 96 includes: a rasterizer 97, a color correction module 98, and a halftone module 99. The color correction module 98 uses the color correction table CT. The halftone module 99 uses the threshold table ThT, the relative density table RT, and the distribution matrix DM. The halftone module 99 prepares the error buffer 4a in the RAM 4.

As shown in FIG. 10, the rasterizer 97 is for converting color image data handled by the application program 95 into color component data per dot unit. The color component data is in the form of eight-bit CMYK color data ($C_{color}$, $M_{color}$, $Y_{color}$, $K_{color}$) for cyan, magenta, yellow, and black color components. Each data $C_{color}$, $M_{color}$, $Y_{color}$, or $K_{color}$ has a value in the range of 0 to 255.

The color correction module 98 is for performing color correction on the eight-bit CMYK color data ($C_{color}$, $M_{color}$, $Y_{color}$, $K_{color}$) according to the colors and coloring properties of ink used by the printer 22. Because the printer 22 creates images by using ink of six colors C: cyan, M: magenta, Y: yellow, K: black, Lc: light cyan, and Lm: light magenta, the color correction module 98 converts the eight-bit CMYK color data ($C_{color}$, $M_{color}$, $Y_{color}$, $K_{color}$) into eight-bit CMYKLcLm ink data ($C_{in}$, $M_{in}$, $Y_{in}$, $K_{in}$, $Lc_{in}$, $Lm_{in}$) while referring to the color correction table CT. Each data $C_{in}$, $M_{in}$, $Y_{in}$, $K_{in}$, $Lc_{in}$, or $Lm_{in}$, has a value also in the range of 0 to 255.

The color correction table CT includes data indicative of the distribution curve DC shown in FIG. 11 for each of cyan and magenta components. In this graph, the dotted line is for normal ink and the solid line is for light ink. While referring to the distribution curve DC for cyan color, the color correction module 98 prepares eight-bit normal cyan ink data $C_{in}$ and eight-bit light cyan ink data $Lc_{in}$ based on the original eight-bit cyan color data $C_{color}$.

More specifically, the color correction module 98 determines the level $C_{in}$ of normal cyan ink and the level $Lc_{in}$ of light cyan ink, while referring to the distribution curve DC and based on the original color value $C_{color}$. For example, when the original value $C_{color}$ is 30, the level $Lc_{in}$ of light cyan is set to 51 and the level $C_{in}$ of normal cyan is set to 1. In this way, the color correction module 98 converts eight-bit cyan color data $C_{color}$ into eight-bit normal cyan ink data $C_{in}$ and eight-bit light cyan ink data $Lc_{in}$.

Similarly, while referring to the distribution curve DC for magenta color, the color correction module 98 prepares eight-bit normal magenta ink data $M_{in}$ and eight-bit light magenta ink data $Lm_{in}$ based on the original eight-bit magenta color data $M_{color}$. Thus, the color correction module 98 converts eight-bit magenta color data $M_{color}$ into eight-bit normal magenta ink data $M_{in}$ and eight-bit light magenta ink data $Lm_{in}$.

As shown in FIG. 10, the thus obtained eight-bit CMYKLcLm ink data ($C_{in}$, $M_{in}$, $Y_{in}$, $K_{in}$, $Lc_{in}$, $Lm_{in}$) is then outputted to the halftone module 99.

The halftone module 99 is for receiving the eight-bit CMYKLcLm ink data ($C_{in}$, $M_{in}$, $Y_{in}$, $K_{in}$, $Lc_{in}$, $Lm_{in}$) as input data Iin, converting the input data Iin into two-bit CMYKLcLm ink data ($C_{in}$, $M_{in}$, $Y_{in}$, $K_{in}$, $Lc_{in}$, $Lm_{in}$), and outputting the resultant two-bit CMYKLcLm ink data ($C_{out}$, $M_{out}$, $Y_{out}$, $K_{out}$, $Lc_{out}$, $Lm_{out}$) as output data Iout to the printer 22. Each output data Iout (=$C_{out}$, $M_{out}$, $Y_{out}$, $K_{out}$, $Lc_{out}$, or $Lm_{out}$) has a multi-level (two-bit) value of 0, 1, 2, or 3. The thus obtained multi-level halftone image data renders density for a certain surface area according to the existence of ink in dot units. As described already, the printer 22 has four levels of gradation per pixel by ejecting a large dot, a medium dot, a small dot, and a non-dot. Accordingly, the halftone module 99 determines four levels of gradation per pixel such that output data Iout with a value of 0 is indicative of "output no dot", output data Tout with a value of 1 is indicative of "output small dot", output data Iout with a value of 2 is indicative of "output medium dot", and output data Iout with a value of 3 is indicative of "output large dot".

In this way, by the CPU 2 executing the halftone module 99, the personal computer 90 serves as an error-diffusion multilevel halftone processor of the present embodiment to convert eight-bit CMYKLcLm input data Iin into two-bit CMYKLcLm output data Iout.

Next will be described in greater detail how the halftone module 99 executes the error-diffusion multilevel halftone process.

It is noted that as described above, the threshold memory 10a stores therein the threshold table ThT as shown in FIG. 12(A). The threshold table ThT stores therein three thresholds Ta, Tb, and Tc (where Ta>Tb>Tc) for each of the six ink colors. The thresholds Ta, Tb, and Tc are used for determining whether or not to form large dots, medium dots, and small dots, respectively.

When a print command is issued from the application program 95, the halftone module 99 retrieves the threshold table ThT from the threshold memory 10a, and sets the threshold table ThT in the RAM 4.

The relative density value memory 10b stores therein a plurality of relative density tables RT. As shown in FIG. 12(B), each relative density table RT stores therein relative density values R in correspondence with each of the six ink colors and in correspondence with each of the four dot-gradations.

It is noted that relative density values R for each ink color are defined as indicative of the density ratios of large, medium, small, and non dots relative to the large dot, wherein the density of the large dot is set to the value of 255.

It is further noted that the relative density values R differ according to printing conditions such as ink type, printing medium, and resolution. Hence, the plurality of relative density tables RT are prepared in advance in correspondence with the plurality of different conditions, and are stored in the relative density value memory 10b. When a print command is issued from the application program 95, the halftone module 99 retrieves, from the relative density value memory 10b, one relative density table RT that corresponds to the condition of the present printing operation, and sets the retrieved relative density table RT in the RAM 4.

The distribution matrix memory 10c stores therein the distribution matrix DM shown in FIG. 12(C). The distribution matrix DM lists up weight coefficients, which are used to distribute, to a pixel that is being presently processed and that is indicated by a mark (*), portions of errors which are obtained at nearby pixels, which are located adjacent to the subject pixel and which have been processed previously.

Figure 13B:
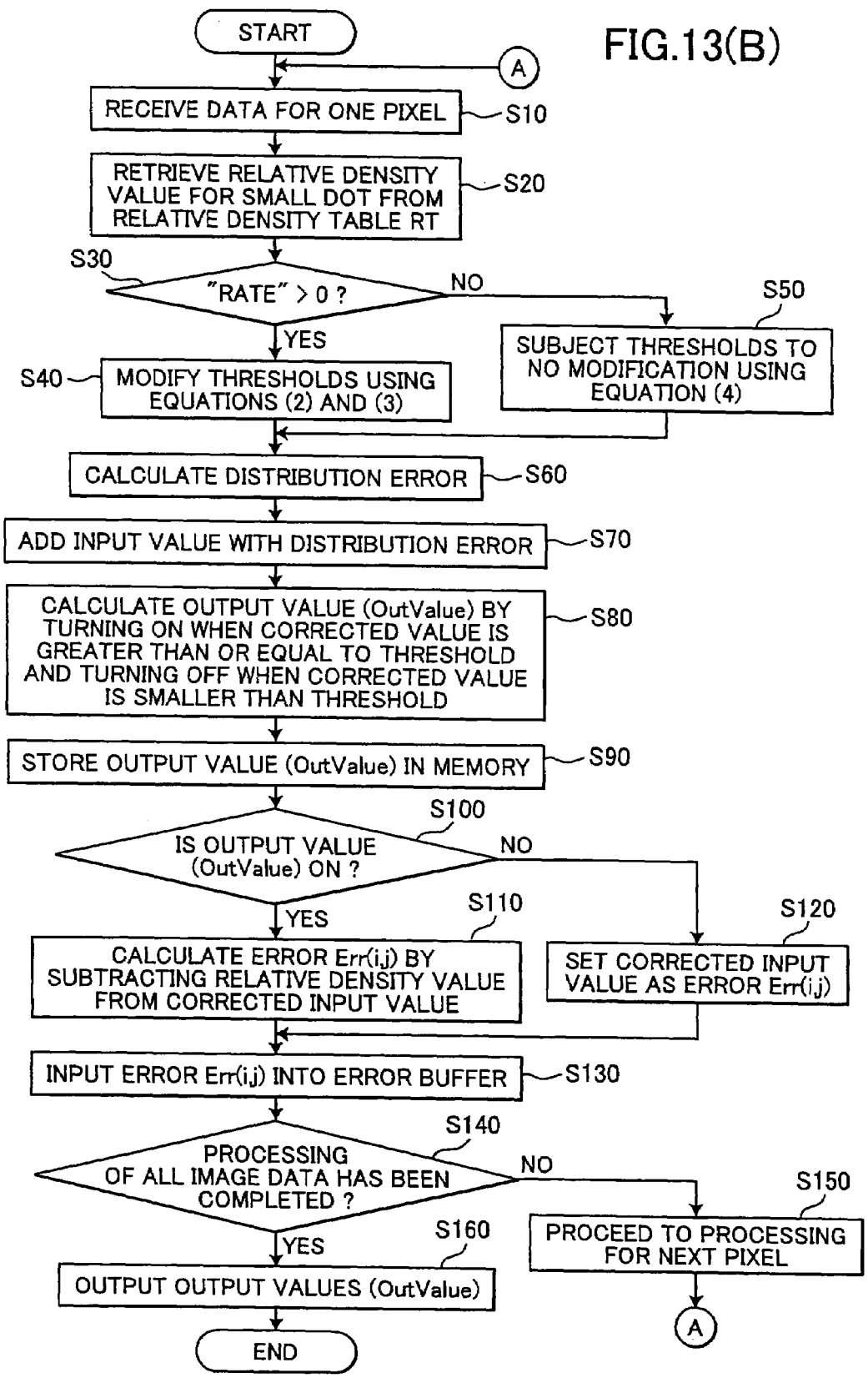
FIG. 13(B) is a flowchart illustrating the error-diffusion multilevel halftone process according to the first embodiment.

FIG. 13(A) is a functional block diagram showing an overview of the error-diffusion multilevel halftone process that is executed by the halftone module 99 for eight-bit input data Iin (=$C_{in}$, $M_{in}$, $Y_{in}$, $K_{in}$, $Lc_{in}$, or $Lm_{in}$).

It is noted that when the halftone module 99 starts performing the error-diffusion multilevel halftone process for input data Iin indicative of a desired image, pixels (x, y) of the image are successively processed from the upper left corner (original position (0, 0)) of the subject image in the main scanning direction X and the sub scanning direction Y.

In the following description, it is assumed that the error-diffusion multilevel halftone process is executed for the successive pixels to convert their eight-bit normal cyan data $C_{in}$ (input value $I_{in}$) into two-bit normal cyan data $C_{out}$ (output value Iout).

As shown in FIG. 13(A), the halftone module 99 includes: an adding section 99a, a comparing section 99b, a converting section 99c, a subtracting section 99d, a judging section 99e, and a calculating section 99f.

When an eight-bit input value $C_{in}$ (Iin) for one pixel (x, y) is inputted to the halftone module 99 from the color correction module 98, the judging section 99e searches the relative density table RT (FIG. 12(B)), and retrieves one relative density value $R_{small}$ that corresponds to the ink color (parameter) of the input data Iin and to the "small size dots". In this example, because the ink color of the input data Iin is normal cyan, the judging section 99e retrieves relative density value $R_{small}$ of "60" from the relative density value table RT.

Then, the judging section 99e uses the following equation (1) to determine the value of "rate":

$$\text{"rate"} = 1 - \{abs[\text{"input value"} - (\text{"relative density value for small dot"})/2]\text{"range"}\} \quad (1)$$

wherein "abs [ ]" is an operator for calculating an absolute value of a value in brackets [ ], the value of "range" is fixed to 10, and the value of "relative density value for small dot" is set to 60 in this example. It is noted that when the input data Iin is for magenta, yellow, black, light cyan, or light magenta, the value of "relative density value for small dot" is set to 100, 120, 115, 102, and 101, respectively, as apparent from FIG. 12(B).

The judging section 99e executes a judgment to determine whether or not the value of "rate" is greater than zero (0).

The calculating portion 99f then retrieves the thresholds Ta, Tb, and Tc for the color of the input value Iin from the threshold table ThT (FIG. 12(A). In this example, Ta=176, Th=96, and Tc=0 because the input data Iin is for normal cyan. The calculating portion 99f then modifies the thresholds Ta, Tb, and Tc into modified thresholds Ta', Tb', and Tc' by selectively adding noise to the thresholds Ta, Tb, and Tc dependently on the judgment results.

More specifically, if the "rate" is greater than zero (0), the calculating portion 99f uses the following equations (2) and (3) to modify the thresholds Ta, Tb, and Tc into the modified thresholds Ta', Tb', and Tc', respectively:

"modified threshold"="threshold"+"noise"  (2)

"noise"="rate"×"coefficient"×"white noise"  (3), wherein the value of "threshold" is the value of threshold Ta, Tb, or Tc, the value of "coefficient" is fixed to 0.2, and the value of "white noise" is a random number that varies in a range of −255 to 255. In this way, the thresholds Ta, Tb, and Tc, which have the values of "threshold" are modified into the modified thresholds Ta', Tb', and Tc', which have the values of "modified threshold". Thus, the equation (2) can be expressed as Ta'=Ta+"noise", Tb'=Tb+"noise", and Tc'=Tc+"noise". The modified thresholds Ta', Tb', and Tc' also satisfy the relationship of Ta'>Tb'>Tc'.

On the other hand, when the "rate" is smaller than or equal to zero (0), the calculating section 99f uses the following equation (4) to modify the thresholds Ta, Tb, and Tc into the modified thresholds Ta', Tb', Tc', respectively:

"modified threshold"="threshold"  (4)

The equation (4) can be expressed as Ta'=Ta, Tb'=Tb, and Tc'=Tc.

In this way, the calculating portion 99f adds noise to the thresholds Ta, Th, and Tc when the "rate" is greater than 0, but adds no noise to the thresholds Ta, Tb, and Tc when the "rate" is smaller than or equal to 0.

The adding section 99a adds, to the input value Iin (Cin, in this example) for the subject pixel (x, y), with portions of errors distributed from the already-processed nearby pixels (x−2, y−2), (x−1, y−2), (x, y−2), (x+1, y−2), (x+2, y−2), (x−2, y−1), (x−1, y−1), (x, y−1), (x+1, y−1), (x+2, y−1), (x−2, y), and (x−1, y). More specifically, the adding section 99a retrieves, from the error buffer 4a, error values, which have been obtained at those nearby pixels, and calculates a distribution error DE by multiplying the error values with the weight coefficients listed in the distribution matrix DM (FIG. 12(C)) by using the following equation (5):

$$\text{"distribution error" } DE =$$
$$1/48 \times E(x-2, y-2) + 3/48 \times E(x-1, y-2) +$$
$$5/48 \times E(x, y-2) + 3/48 \times E(x+1, y-2) +$$
$$1/48 \times E(x+2, y-2) + 3/48 \times E(x-2, y-1) +$$
$$5/48 \times E(x-1, y-1) + 7/48 \times E(x, y-1) +$$
$$5/48 \times E(x+1, y-1) + 3/48 \times E(x+2, y-1) +$$
$$5/48 \times E(x-2, y) + 7/48 \times E(x-1, y) \quad (5)$$

wherein E(x+i, y+k) is an error obtained at a nearby pixel (x+i, y+k), wherein i is an integer greater than or equal to −2 and smaller than or equal to +2, and k is an integer greater than or equal to −2 and smaller than or equal to zero (0).

In this way, the adding section 99a determines a corrected input value Iin' by adding the distribution error DE to the input value Iin.

The comparing section 99b compares the corrected input value Iin' with each of the three modified thresholds Ta', Tb', and Tc'.

When comparing the corrected input value Iin' with the three thresholds Ta', Tb', and Tc', the comparator 99b outputs: an output value Iout of a value (3) indicative of "output large dot" when the corrected input value, Iin' is greater than the threshold Ta'; an output value Iout of a value (2) indicative of "output medium dot" when the corrected input value Iin' is greater than threshold Tb' but smaller than threshold Ta'; an output value Iout of a value (1) indicative of "output small dot" when the corrected input value Iin' is greater than threshold Tc' but smaller than threshold Tc'; and an output value Iout of a value (0) indicative of "output no dot" when the corrected input value Iin' is smaller than threshold Tc'. The thus obtained output data Iout will be outputted as two-bit output data (final data FNL) to the printer 22.

The converting section 99c searches the relative is density table RT, and retrieves one relative density R dependently on the ink color of the subject input data Iin (normal cyan, in this example) and on whether the output value Iout is indicative of a large dot, medium dot, small dot, or no dot. For example, when the normal cyan input data Cin is converted into normal cyan output data Cout indicative of output of a large dot, the converter 99c retrieves the relative density value R of "255" from the relative density table RT (FIG. 12(B)). When the normal cyan input data Cin is converted into normal cyan output data Cout indicative of output of a medium dot, the converter 99c retrieves the relative density value R of "176" from the relative density table RT. When the normal cyan input data Cin is converted into normal cyan output data Cout indicative of output of a small dot, the converter 99c retrieves the relative density value R of "60" from the relative density table RT. When the normal cyan input data Cin is converted into normal cyan output, data Cout indicative of output of a non dot, the converter 99c retrieves the relative density value R of "0" from the relative density table RT. The converter 99c converts the output data Cout into the thus retrieved relative density value R.

The subtracting portion 99d determines an error for the present pixel (x, y) by calculating the difference between the corrected input value Iin' and the converted relative density value R. The subtracting portion 99d records the error in the error buffer 4a.

The adding section 99a, comparing section 99b, converting section 99c, subtracting section 99d, judging section 99e, and the calculating section 99f perform the same processes as described above repeatedly until all the pixels are completely processed.

The judging section 99e calculates the value "rate" and judges whether the value "rate" is greater than zero (0) every time when the halftone module 99 receives CMYKLcLm input data in (=Cin, Min, Yin, Kin, Lcin, or Lmin) from the color correction module 98. The calculating section 99*f* modifies the thresholds Ta, Tb, and Tc based on the judgment results.

FIG. 13(*b*) is a flowchart illustrating the error-diffusion multilevel halftone process executed by the halftone module 99 of the present embodiment.

First, in S10, data for one pixel (present pixel (x, y)) is received from the color correction module 98, and is set as an input value Iin.

In S20, the relative density value for a small dot of a corresponding ink color is retrieved from the relative density table RT.

In S30, the equation (1) is used to calculate the value "rate", and it is judged whether or not the value "rate" is greater than zero (0).

If the value "rate" is greater than zero (0) (yes in s30), the equations (2) and (3) are used to convert the thresholds Ta–Tc into modified thresholds Ta'–Tc' in S40. On the other hand, if the value "rate" is smaller than or equal to zero (0) (no in S30), the equation (4) is used to convert the thresholds Ta–Tc into modified thresholds Ta'–Tc' in S50.

In S60, errors generated for the same color of the input value Iin at already-processed pixels adjacent to the present pixel (x, y) are read from the error buffer 4*a* and collected as a distribution error DE by using the distribution matrix DM and by using equation (5).

In S70, the input value Iin is added with the distribution error DE to produce the corrected input value Iin'.

In S80, the corrected input value Iin' is then compared with the modified thresholds Ta', Tb', and Tc' (Ta'>Tb'>Tc'). Based on the relationship of the corrected input value Iin' with the thresholds Ta', Th', and Tc', the value of 0, 1, 2, or 3 is outputted as an output value Iout.

The output value Iout is stored in the RAM 4 in S90. Also in S90, a relative density value R is extracted from the relative density table RT based on the output value Iout and the color of the processed input value Iin.

When the output value Iout is ON (Yes in S100), that is, when the output value is either one of 3 (output large dot), 2 (output medium dot), or 1 (output small dot), an error is calculated by subtracting the relative density value R from the corrected input value Iin' in S110.

On the other hand, when the output value Iout is OFF, that is, when the output value Iout is 0 (output no dot) (No in S100), the corrected input value Iin' is set as the error in S120.

In S130, the calculated error is inputted into the error buffer 4*a*.

In S140, it is determined whether or not input data Iin for the entire image has been processed.

If the processing is not complete for all the pixels (No in S140), the program proceeds to the next pixel in S150, and the process from S10 is repeated for the next pixel.

On the other hand, if all the pixels have been processed completely (yes in S140), the output values Iout stored in the RAM 4 are outputted to the printer 22 in S160.

Figure 14:
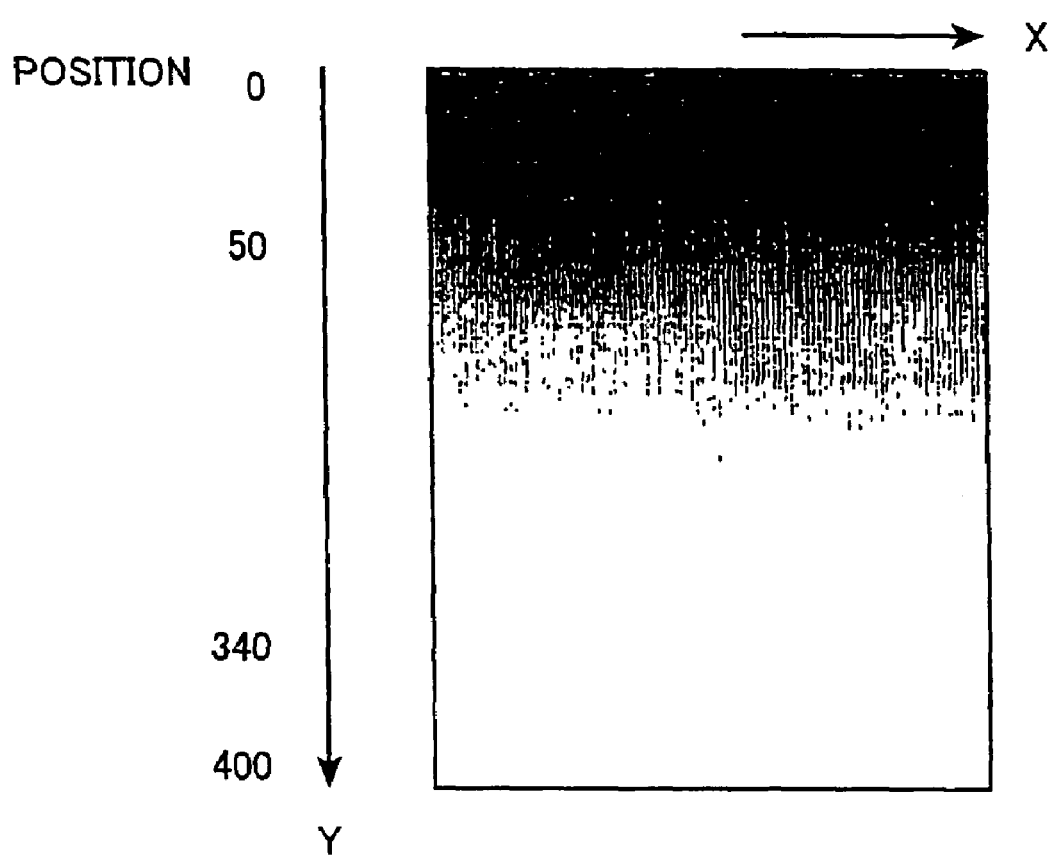
FIG. 14 shows an example of a normal cyan image represented by eight-bit normal-cyan input data Cin.

It is now assumed that the color correction module 98 supplies the halftone module 99 with eight-bit normal-cyan data Cin (Iin) indicative of a normal cyan image shown in FIG. 14. This image is elongated in the sheet conveying direction Y from a specified uppermost row (y=0) to a specified lowermost row (y=400). In such a case, the pixels are successively subjected to the halftone process from the uppermost row (y=0) to the lowermost row (y=400). In each row, pixels are subjected to the halftone process successively from left to right, that is, in the direction in which the x-coordinate value increases. Every time the eight-bit normal-cyan data Cin for one pixel is received, the halftone module 99 judges whether "rate" is greater than zero, and modifies the thresholds Ta–Tc into the modified thresholds Ta'–Tc' based on the judgment results. The halftone module 99 corrects the eight-bit normal-cyan data Cin by adding portions of errors distributed from the already-processed nearby pixels, and compares the corrected eight-bit normal-cyan data Cin'(Iin') with the modified thresholds Ta'–Tc' and converts the corrected eight-bit normal-cyan data Cin' into two-bit normal-cyan data Cout (Iout). The halftone module 99 then converts the two-bit normal-cyan data Cout into a corresponding relative density value R (=255, 176, 60, or 0). The difference between the converted relative density value R and the error-added (corrected) eight-bit normal-cyan data Cin' is stored as an error in the error buffer 4*a*.

Next will be described how the error-diffusion multilevel halftone process of the present embodiment removes false contours.

Figure 2:
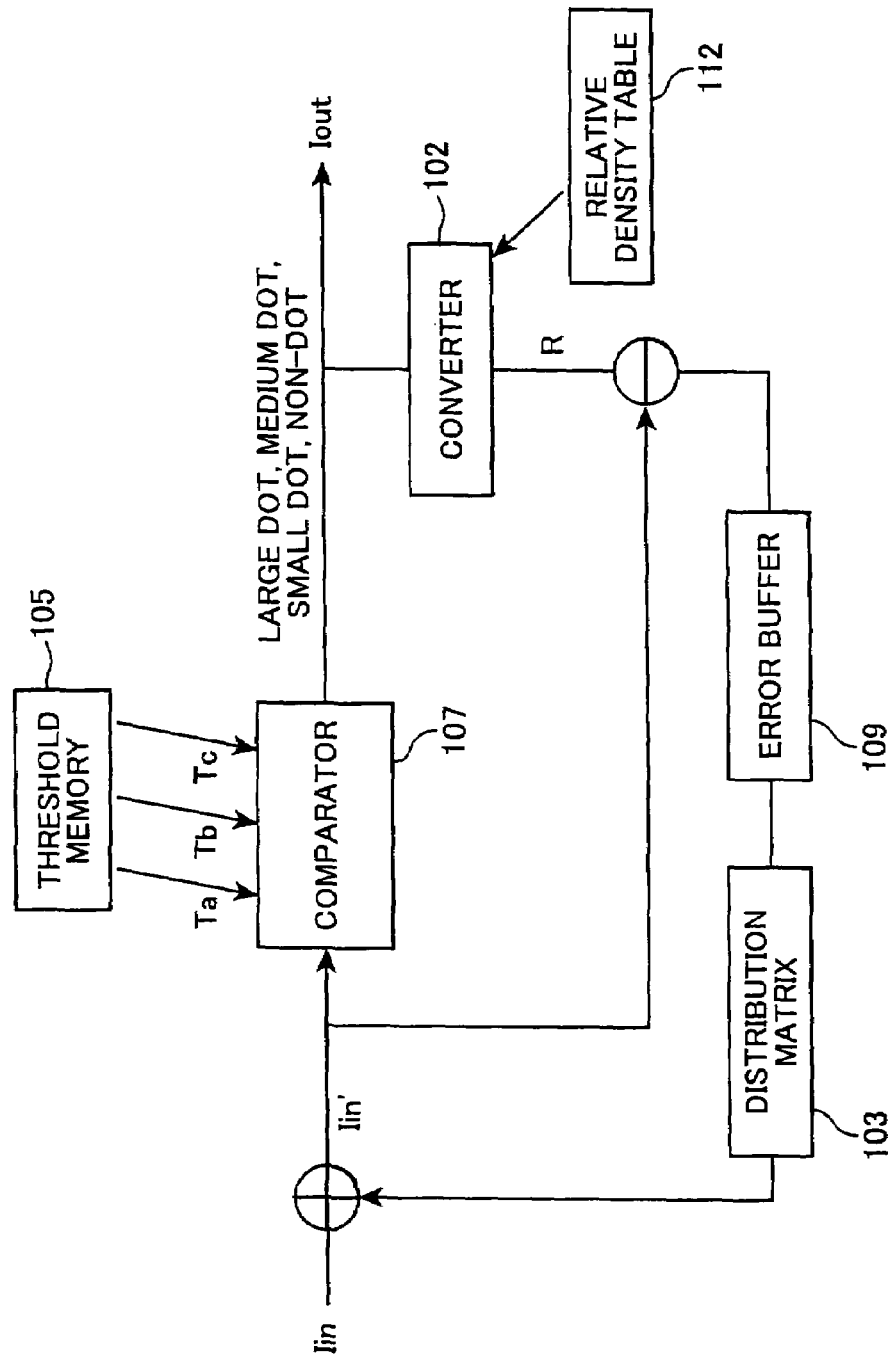
FIG. 2 is a block diagram showing an outline of the processes in the conventional multilevel error-diffusion halftone method.
Figure 3A:
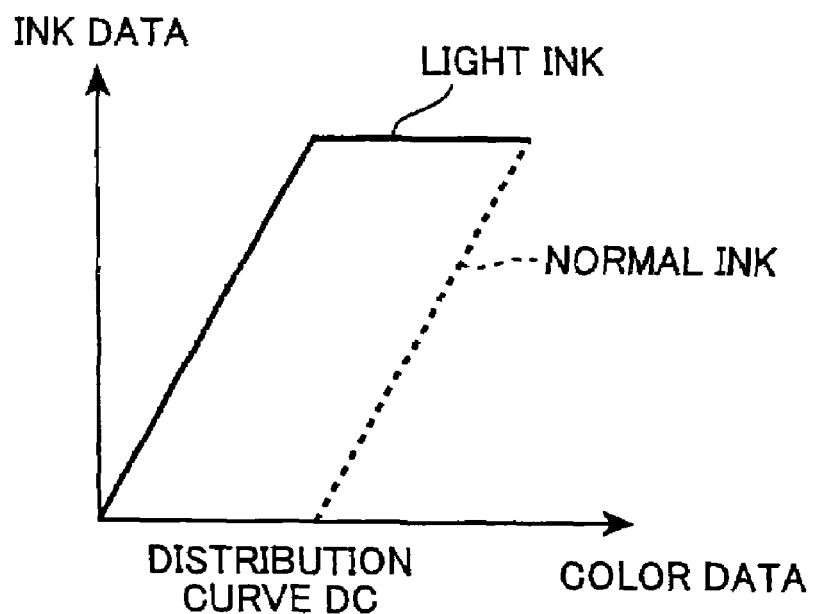
FIGS. 3(A) and 3(B) are explanatory diagrams showing examples of distribution curves DC used to convert each of cyan and magenta color components into light ink and normal ink.
Figure 3B:
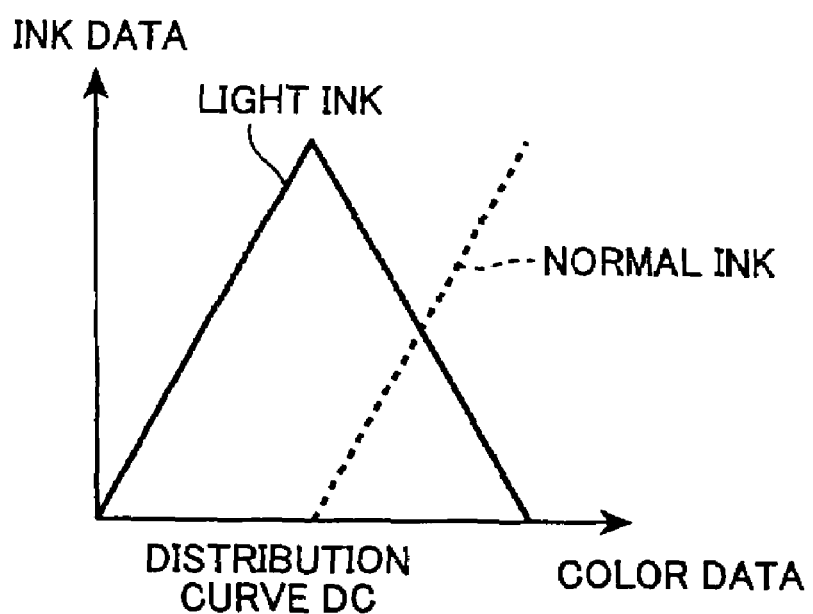

The present inventors conducted a first experiment to subject the eight-bit normal-cyan data Cin of FIG. 14 into the conventional error-diffusion multilevel halftone process shown in FIG. 2. The present inventors subjected the same eight-bit normal-cyan data Cin of FIG. 14 also into the error-diffusion multilevel halftone process of the present embodiment shown in FIG. 13(A).

It is noted that in the image of FIG. 14, the eight-bit normal-cyan values Cin for all the pixels in each row ($0 \leq y \leq 400$) are equal to one another, and therefore the normal cyan density is uniform at each row. The cyan density represented by the eight-bit normal-cyan data Cin is kept almost unchanged from the uppermost row (y=0) to around a first medium row (y=50), then gradually decreases from around the first medium row to around a second medium row (y=340), and then kept unchanged from around the second medium row (y=340) to the lowermost row (y=400). The cyan density between the uppermost row (y=0) and around the first medium row (y=50) has a value slightly smaller than 100. The cyan density between the second medium row (y=340) and the lowermost row (y=400) has a value of zero (0) During each of the conventional process and the process of the present embodiment, every time after the eight-bit data Cin for all the pixels in one row is halftone processed into two-bit data Cout and converted into relative density values R (=255, 176, 60, or 0), an average is calculated for the relative density values R converted for all the pixels in that row.

Figure 15A:
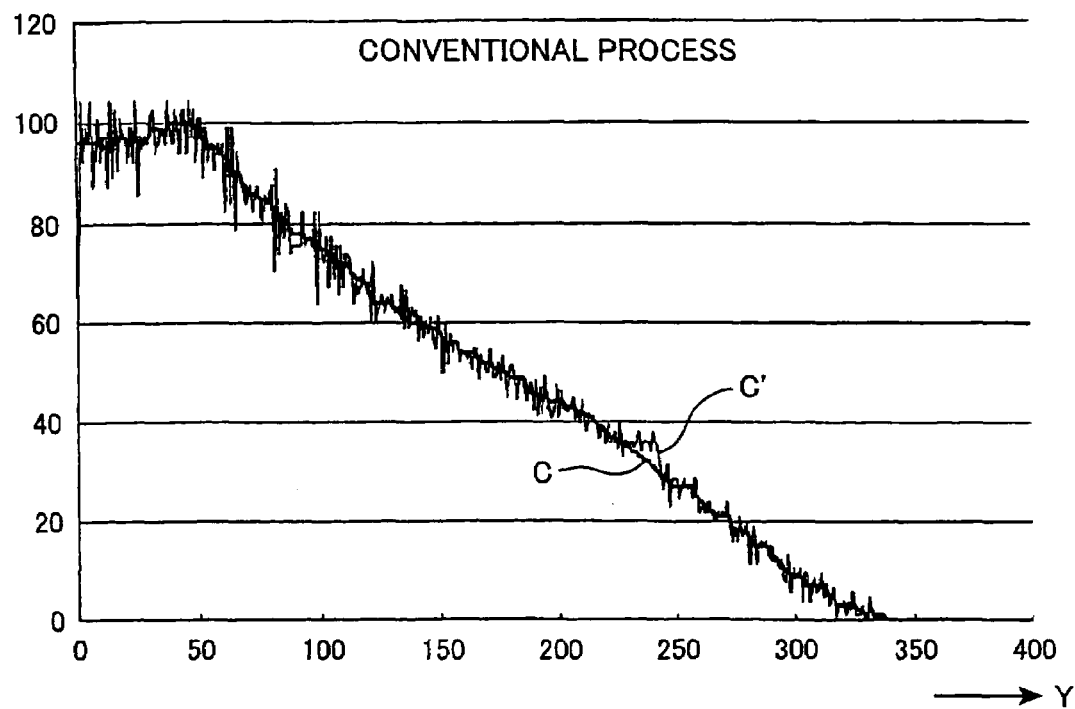
FIG. 15(A) shows the relationship between the normal cyan input data (smoothly-decreasing line C) and the normal-cyan output average (rapidly-vibrating, decreasing line C') obtained by the conventional multilevel error-diffusion halftone process.
Figure 15B:
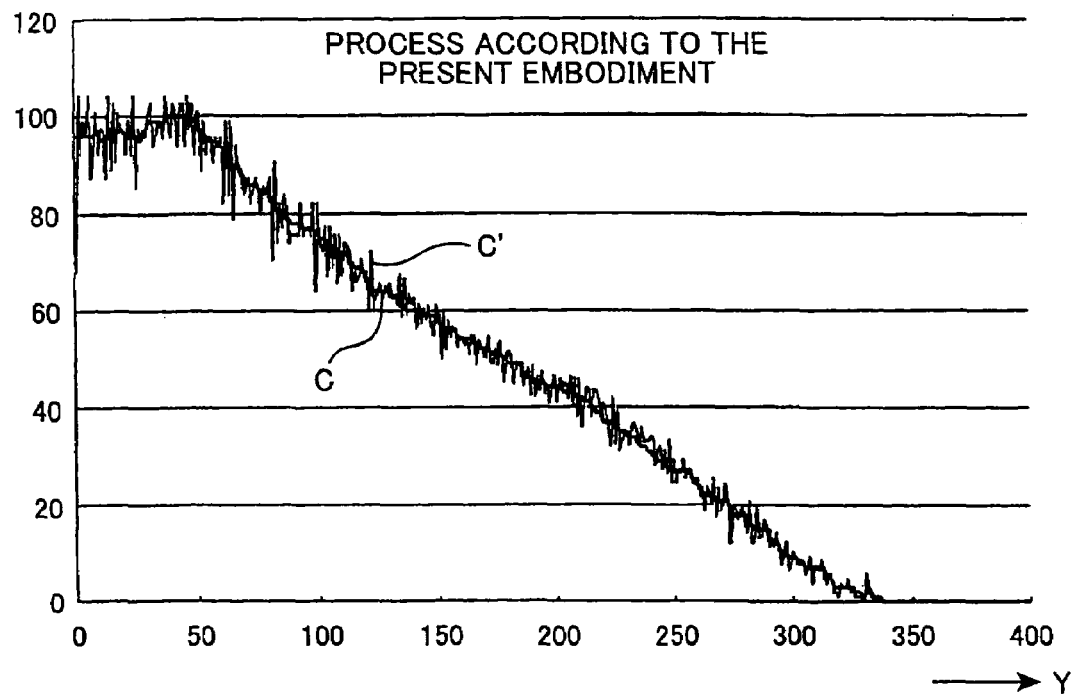
FIG. 15(B) shows the relationship between the normal cyan input data (smoothly-decreasing line C) and the normal cyan output value average (rapidly-vibrating, decreasing line C') obtained by the multilevel error-diffusion halftone process of the first embodiment.

FIG. 15(*a*) shows the results obtained by the conventional process, and FIG. 15(B) shows the results obtained by the process of the present embodiment. In both of the graphs of FIGS. 15(A) and 15(B), the horizontal axis denotes the positions (rows) on the image of FIG. 14 along the sheet conveying direction Y, while the vertical axis denotes the magnitudes of the input values (eight-bit normal cyan data Cin) and of the output value averages (averages of the converted relative densities R).

In each graph, the input values (eight-bit normal-cyan values Cin) were plotted from the position (y=0) to the position (y=400), thereby forming a smoothly-decreasing line C. The output value averages (averages of the converted relative densities R) were plotted also from position (y=0) to position (y=400), thereby forming a rapidly-vibrating, decreasing line C'.

As apparent from FIG. 15(A), the output value average C' drops from a level state abruptly at the positions y=240 to 250, generating a vertical separation from the input value C. This separation is found to result in a false contour. Hence, it is found out that a false contour is generated at a point around the eight-bit normal cyan input data Cin of "30", which is a half of the relative density value $R_{small}$ of "60" that is listed for the normal cyan small dot in the relative density table RT (FIG. 12(B)). It is therefore confirmed that false contours are generated in normal cyan gradation areas that are formed by small dots of normal cyan ink.

Contrarily, FIG. 15(B) confirms that the vertical separation shown in FIG. 15(A) is eliminated. According to the present embodiment, it is judged in S30 (FIG. 13(B)) whether or not the value "rate" for each pixel is greater than zero (0). In other words, the halftone module 99 of the present embodiment judges whether or not the eight-bit normal cyan input data Cin of each pixel is around a half of the relative density value "60" for a small dot. If the eight-bit normal cyan input data Cin of the subject pixel is near to a half of the relative density value "60" for a small dot, the halftone module 99 adds noise to the threshold values Ta, Tb, and Tc in S40. The halftone module 99 uses the noise-added threshold values Ta', Tb', and Tc' in the comparing process of S80. As a result, the vertical separation portion is eliminated, thereby eliminating the false contour.

Figure 1:
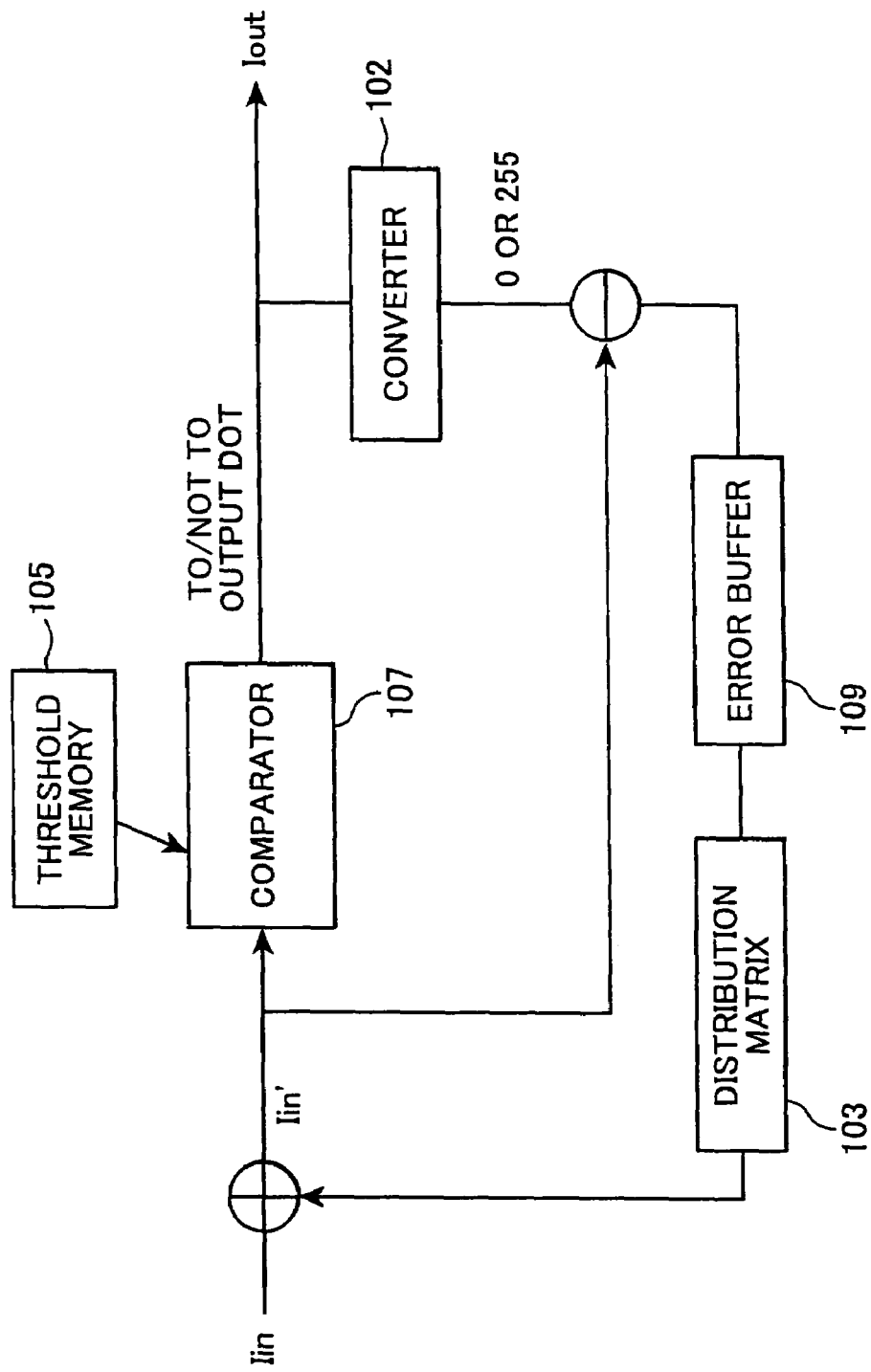
FIG. 1 is a block diagram showing an outline of the processes in the conventional bi-level error-diffusion halftone method.
Figure 15C:
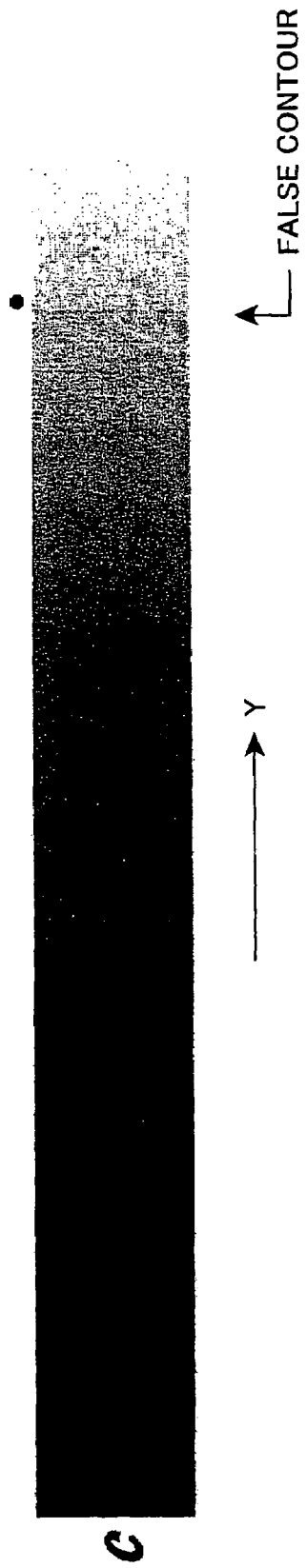
FIG. 15(C) shows a print sample obtained by the conventional multilevel error-diffusion halftone process.
Figure 15D:
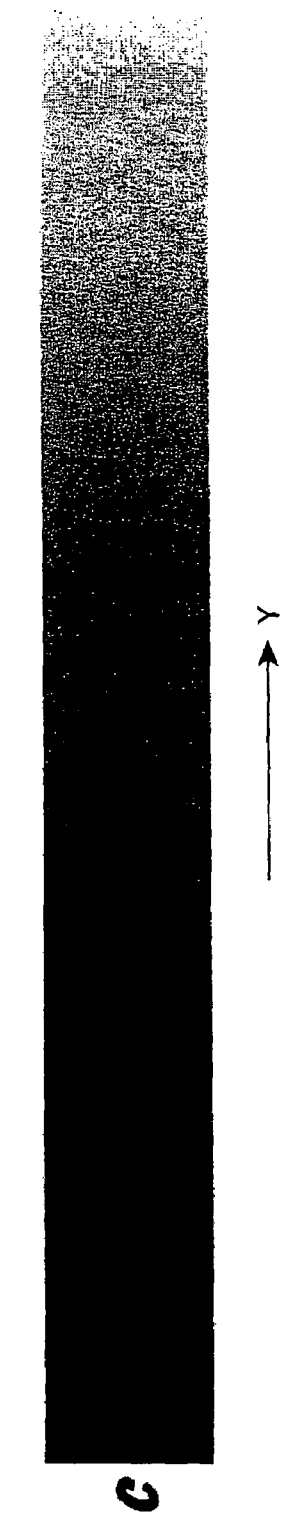
FIG. 15(D) shows a print sample obtained by the multilevel error-diffusion halftone process of the present embodiment.

FIG. 15(C) shows a print sample obtained by the above-described first experiment using the conventional halftone process, while FIG. 1(D) shows a print sample obtained by the first experiment using the halftone process of the present embodiment. As apparent from FIG. 15(C), a false contour was generated in the form of a vertical border line when the conventional halftone method was used. Contrarily, according to the present embodiment, no false contour was generated.

In this way, according to the present embodiment, noise is added to the input value Iin when the input value Iin is around the specific value (one-half of the relative value of a small dot). It is possible to effectively prevent the generation of false contours. In this example, a false contour is effectively removed by adding noise to input values Cin around 30.

Additionally, according to the present embodiment, it is possible to quickly determine whether a noise signal should be added to the thresholds simply by extracting one of the relative values from the relative density table RT based on the ink color of the input data Iin and judging whether the input data Iin is around approximately a one-half of the extracted relative density value. It is therefore possible to effectively prevent false contours.

The "rate" is calculated by the equation (1) and the "noise" is in proportion to the value of "rate" as indicated by equation (3). Accordingly, it is possible to add maximum noise signal to thresholds when the input data Iin is exactly equal to the half of the relative density value for a small dot and to gradually decrease this noise signal as the difference, between the input data Iin and the half of the relative density value, increases. Accordingly, the false contour can be eliminated more effectively.

The experimental results of FIGS. 15(A) and 15(B) confirm that the process of the present embodiment can eliminate false contours at gradation portions formed by small dots of normal cyan ink. However, the present embodiment is not limited to elimination of false contours formed in such cyan small-dot gradation regions. The present inventors performed additional experiments by substituting the relative density value "176" (for medium dots) for the "relative density value for small dot" in formula (1), and confirmed that the process of the present embodiment can eliminate false contours in gradation regions by cyan medium dots. The present inventors performed further additional experiments by substituting the relative density value "255" (for large dots) for the "relative density value for small dot" in formula (1), and confirmed that the process of the present embodiment can eliminate false contours in gradation regions by cyan large dots.

Additionally, the present embodiment is not limited to elimination of false contours for normal cyan images. The present inventors performed additional experiments by substituting the relative density values for other various ink colors for the "relative density value for small dot" in formula (1), and confirmed that the process of the present embodiment can eliminate false contours formed in other ink images. By executing these experiments, it is confirmed that the process of the present embodiment can eliminate false contours for combinations of any ink colors (cyan, black, magenta, yellow, light cyan, and light magenta) and any dot-sized gradations (small-dot gradations, large-dot gradations, and medium-dot gradations). For example, if light magenta input data Lmin is inputted from the color correction module 98 to the halftone module 99, relative density value "183" may be substituted for the "relative density value for small dot" in formula (1) when desiring to eliminate false contours occurring in light-magenta medium-dot gradations.

Second Embodiment

Next will be described a second embodiment of the present invention.

The halftone module 99 according to the second embodiment is for preventing false contours in cyan continuous tone images. The halftone module 99 according to the second embodiment performs judgment operation only when the halftone module 99 receives normal-cyan input data Cin from the color correction module 98. The halftone module 99 of the present embodiment modifies the thresholds for normal cyan based on the judged results.

Figure 16A:
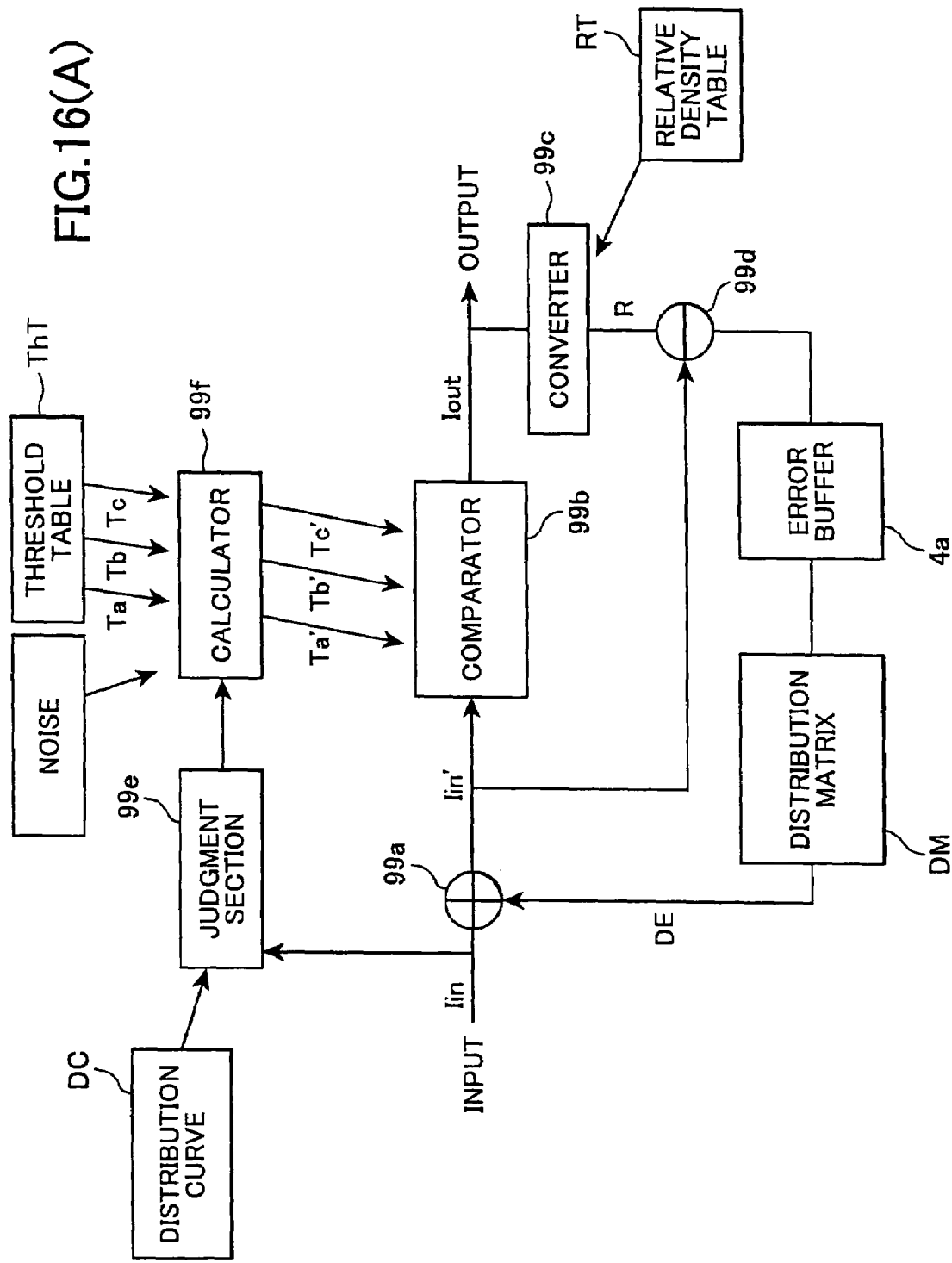
FIG. 16(A) is a functional block diagram showing the multilevel error-diffusion halftone process according to a second embodiment.

FIG. 16(A) is a functional block diagram showing an overview of the error-diffusion multilevel halftone process that is executed by the halftone module 99 of the present embodiment for normal cyan ink data Cin.

The judgment operation by the judgment section 99e is different from that of the first embodiment in the points described below.

According to the present embodiment, when the halftone module 99 receives the eight-bit normal cyan input data Cin as an input value Iin, the judging section 99e uses the following equation (6) to calculate the value of "rate" instead of using the equation (1):

"rate"=1−{["input value"−("normal-cyan minimum value in distribution curve"+1)]/range}    (6)

wherein the value "range" is fixed to 10, and the "normal-cyan minimum value in distribution curve" is the minimum value in the normal-cyan-ink value varying range in the distribution Curve DC of FIG. 11. Accordingly, the judging section 99e determines the value of "rate" while referring to the distribution curve DC in the color correction table CT. In this example, as apparent from FIG. 11, the distribution curve DC indicates that the normal-cyan value varies in the range of 0 to 153, and therefore the normal-cyan minimum value in "distribution curve" in equation (6) is set to 0. Accordingly, the equation (6) can be expressed as "rate"=1−{["input value"−1]/range}.

The judging section 99e then judges whether or not the value of "rate" is greater than zero (0) and smaller than or equal to one (1).

When the "rate" is greater than zero (0) and smaller than or equal to one (1), the calculating section 99f modifies thresholds Ta, Tb, and To into modified thresholds Ta', Tb', and Tc' by using the above-described equations (2) and (3). On the other hand, when the "rate" is smaller than or equal to zero (0) or greater than one (1), the calculating section 99f calculates the modified thresholds Ta', Tb', and Tc' as being equal to the original thresholds Ta, Tb, and Tc by using the equation (4).

FIG. 16(*b*) is a flowchart illustrating the error-diffusion multilevel halftone process executed by the halftone module 99 of the present embodiment.

The error-diffusion multilevel halftone process of the present embodiment differs from that of the first embodiment in that the processes of S20 and S30 in the first embodiment (FIG. 13(*b*)) is replaced with processes of S22 and S32.

In S22, the distribution curve DC (FIG. 11) in the color correction table CT is searched, and the minimum value in the normal cyan ink varying range is retrieved. In this example, the minimum value "0" is retrieved.

Then, in S32, the equation (6) is used to calculate the value "rate", and it is judged whether or not the value "rate" is greater than zero (0) and smaller than or equal to 1.

If the value "rate" is greater than zero (0) and smaller than or equal to 1 (yes in S32), the equations (2) and (3) are used to convert the thresholds Ta–Tc into modified thresholds Ta'–Tc' in S40. On the other hand, if the value "rate" is smaller than or equal to zero (0) or greater than 1 (no in S32), the equation (4) is used to convert the thresholds Ta–Tc into modified thresholds Ta'–Tc' in S50.

Next will be described how the halftone module 99 of the present embodiment removes false contours.

Figure 17:
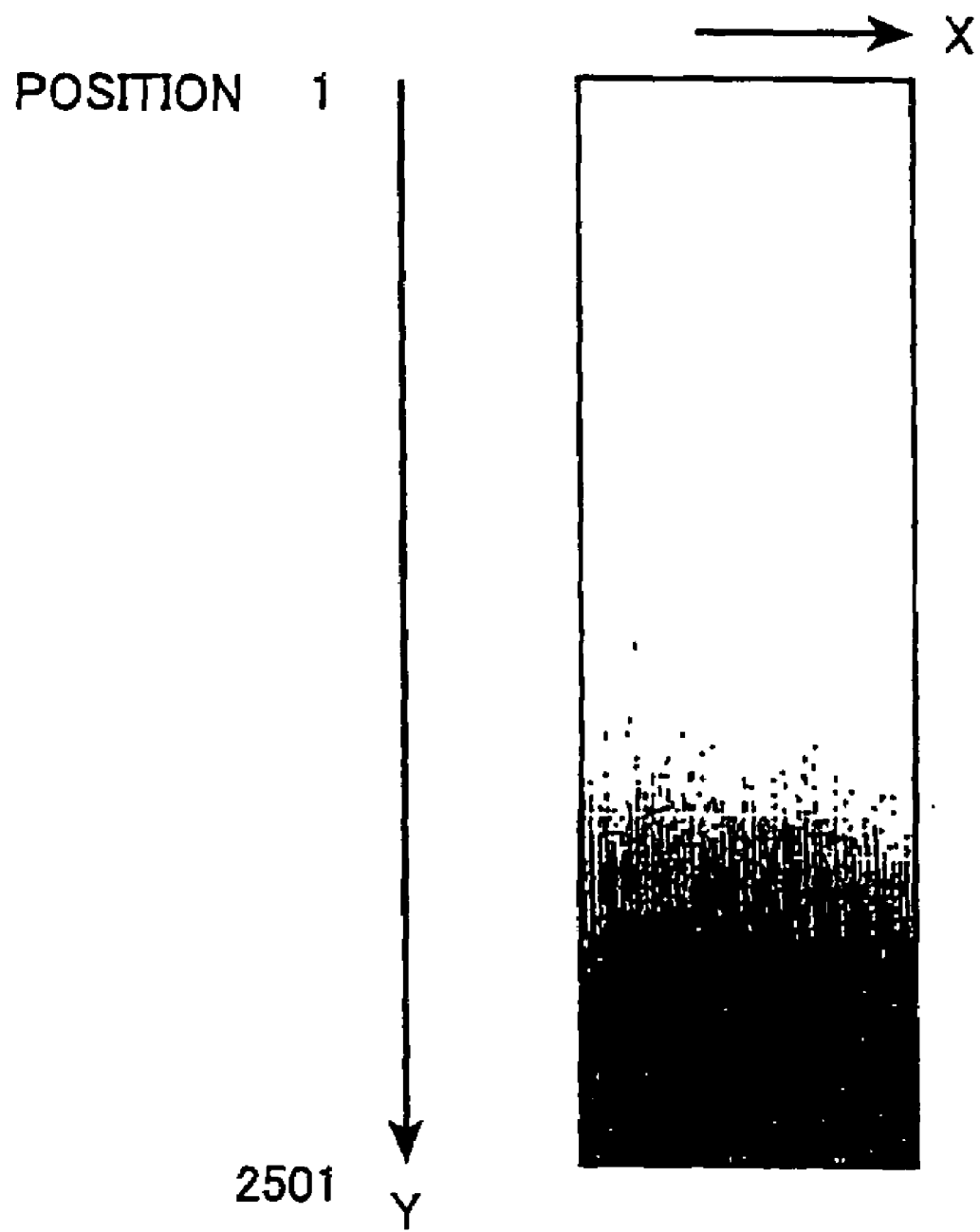
FIG. 17 shows an example of a cyan image represented by eight-bit cyan color data $C_{color}$ inputted to the color correction module.

It is now assumed that the color correction module 98 receives eight-bit cyan-color data $C_{color}$ indicative of a cyan color image shown in FIG. 17. This image is elongated in a direction parallel to the sheet conveying direction y from a specified uppermost row (y=1) to a specified lowermost row (y=2501). Also in this image, the values of the eight-bit cyan-color input data $C_{color}$ for all the pixels in each row are equal to one another, and therefore the cyan density is uniform at each row. The cyan density is gradually increased from position (0) (uppermost row) to position (2501) (lowermost row). In this case, the color correction module 98 converts the eight-bit cyan-color data $C_{color}$ into eight-bit normal-cyan-ink data Cin and eight-bit light-cyan-ink data Lcin. The halftone module 99 halftone processes the eight-bit normal-cyan-ink data Cin into two-bit normal-cyan-ink data Cout, and halftone processes the eight-bit light-cyan-ink data Lcin into two-bit light-cyan-ink data Lcout.

The present inventors conducted a second experiment to subject the eight-bit cyan-color data $C_{color}$ of FIG. 17 to the color correction module 98 to convert the eight-bit cyan-color data $C_{color}$ or into eight-bit normal-cyan-ink data Cin and eight-bit light-cyan-ink data Lcin while referring to the distribution curve DC of FIG. 11 The present inventors subjected the thus obtained eight-bit normal-cyan-ink data Cin and eight-bit light-cyan-ink data Lcin into the conventional error-diffusion multilevel halftone process shown in FIG. 2. The present inventors subjected the same eight-bit normal-cyan-ink data Cin and eight-bit light-cyan-ink data Lcin also into the error-diffusion multilevel halftone process of the present embodiment shown in FIG. 16(A).

During each of the conventional process and the process of the present embodiment, every time after eight-bit normal-cyan data Cin for all the pixels in one row is haftone processed into two-bit normal-cyan data Cout and then converted into relative density values R (=255, 176, 60, or 0), an average is calculated for the relative density values R for all the pixels in that row. Similarly, every time after eight-bit light-cyan data Lcin for all the pixels in one row is haftone processed into two-bit light-cyan data Lcout and then converted into relative density values R (=255, 207, 102, or 0), an average is calculated for the relative density values R for all the pixels in that row.

Figure 18A:
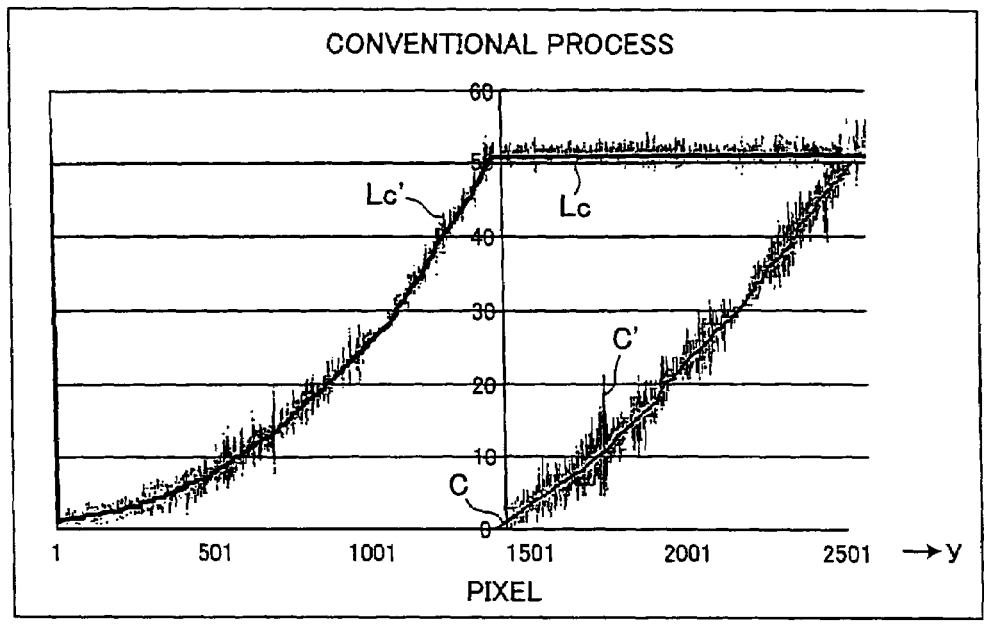
FIG. 18(A) shows the relationship among the light cyan input data (smooth line Lc), and the light cyan output average (rapidly-vibrating line Lc'), the normal cyan input data (smooth line C), and the normal cyan output average (rapidly-vibrating line C') according to the conventional multilevel error-diffusion halftone process.
Figure 18B:
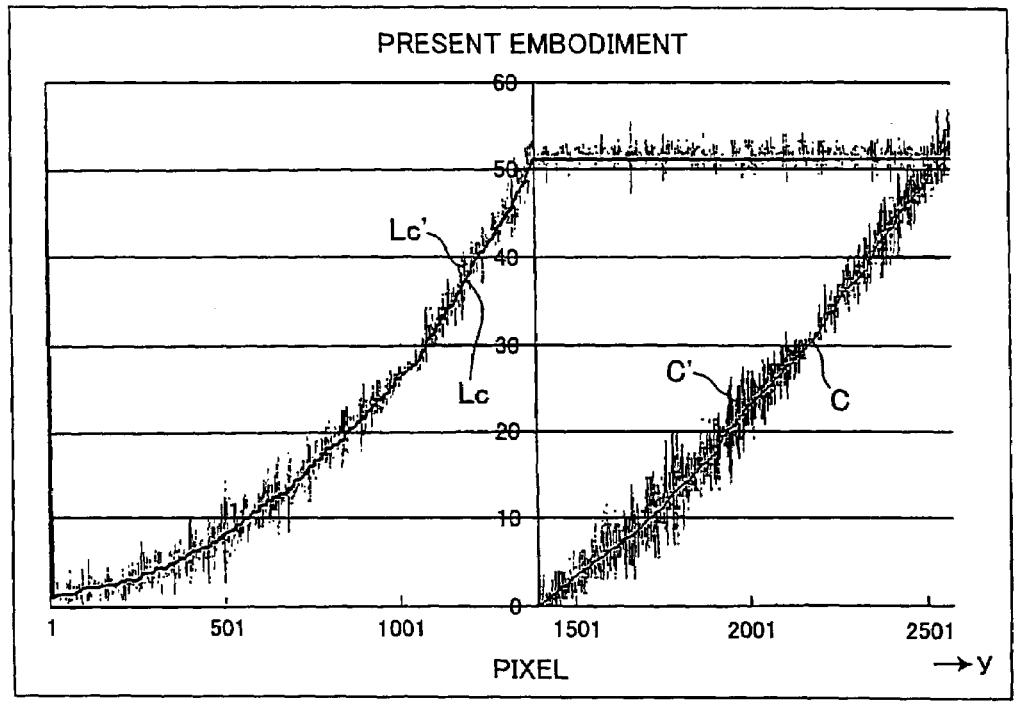
FIG. 18(B) shows the relationship among the light cyan input data (smooth line Lc), and the light cyan output average (rapidly-vibrating line Lc'), the normal cyan input data (smooth line C), and the normal cyan output average (rapidly-vibrating line C') according to the multilevel error-diffusion halftone process of the second embodiment.

FIG. 18(A) shows the results obtained by the conventional process, and FIG. 18(B) show the results obtained by the process of the present embodiment.

In both of the graphs of FIGS. 18(A) and 18(B), the horizontal axis denotes the positions on the image of FIG. 17 along the sheet conveying direction Y. The vertical axis denotes the magnitudes of: the light-cyan input values (eight-bit light-cyan data Lcin), the light-cyan output value averages (averages of the relative densities R converted for light-cyan), the normal-cyan input values (eight-bit normal-cyan data Cin), and the output value averages (averages of the relative densities R converted for normal-cyan).

In each graph, the light-cyan input values (eight-bit light-cyan data Lcin), which are outputted from the color correction module 98, were plotted from the position (y=1) to the position (y=2501), thereby forming a smoothly-extending line Lc. The light-cyan output value averages (averages of the converted light-cyan relative densities R) were plotted also from the position (y–1) to the position (y=2501), thereby forming another line Lc'. The line Lc' extends along the line Lc while rapidly vibrating. Similarly, the normal-line input values (eight-bit normal-cyan data Cin), which are outputted from the color correction module 98, were plotted, thereby forming a smooth-extending line C. The normal-line output value averages (averages of the converted normal-cyan relative densities R) were also plotted, thereby forming another line C'. The line C' extends along the line C while rapidly vibrating.

It is noted that a vertical line is added in the middle of each graph in the horizontal direction. The vertical line extends vertically, and indicates the position y, at which the normal-cyan output value average C' starts increasing from zero (0), thereby starting output of normal-cyan ink dots.

It is noted that as shown in FIG. 11, the normal ink level starts increasing at the position immediately after the light ink level becomes unchanged. Accordingly, the error-diffusion multilevel halftone process has to start outputting normal-cyan ink dots immediately after the light-cyan-ink data Lcin from the color correction module 98 becomes unchanged and the normal-cyan-ink data Cin from the color correction module 98 starts increasing from zero (0). However, as apparent from FIG. 18(A), the normal-cyan output value average line C' starts increasing from zero (0) at a position that is delayed from the position where the normal-cyan input value line C starts increasing. It is therefore found that the conventional halftone process starts outputting normal-cyan ink dots at a position that is delayed from the position where the eight-bit light cyan data Lcin from the color correction module 98 becomes leveled or unchanged and the normal-cyan data Cin from the color-correction module 98 starts increasing from zero (0).

After the light-cyan output value average line Lc' becomes in a substantially level state and before the normal-cyan output value average line C' starts increasing from zero (0), the printer 22 will output a fixed maximum amount of light-cyan ink continuously while outputting no normal-cyan ink Accordingly, a fixed density region is generated. This fixed density region is found in a false contour. Hence, it is found out that a false contour is generated around at a point where normal-cyan ink is started being mixed with light-cyan ink in the region of cyan gradation regions. In this way, it is confirmed that false contours are generated in a cyan gradation area at its is border between the region where only light-cyan ink is used and the other region where both of the light-cyan ink and the normal-cyan ink are used.

Contrarily, FIG. 18(B) confirms that the normal-cyan output value average line C' starts increasing from zero (0) approximately simultaneously when the normal-cyan input value line C starts increasing from zero (0) and the light-cyan output value average line Lc' becomes leveled. In other words, output value of normal cyan starts increasing approximately at the same time as the input value starts increasing. The output value of the light cyan is just starting to plateau when the output value of normal cyan starts increasing.

Figure 16B:
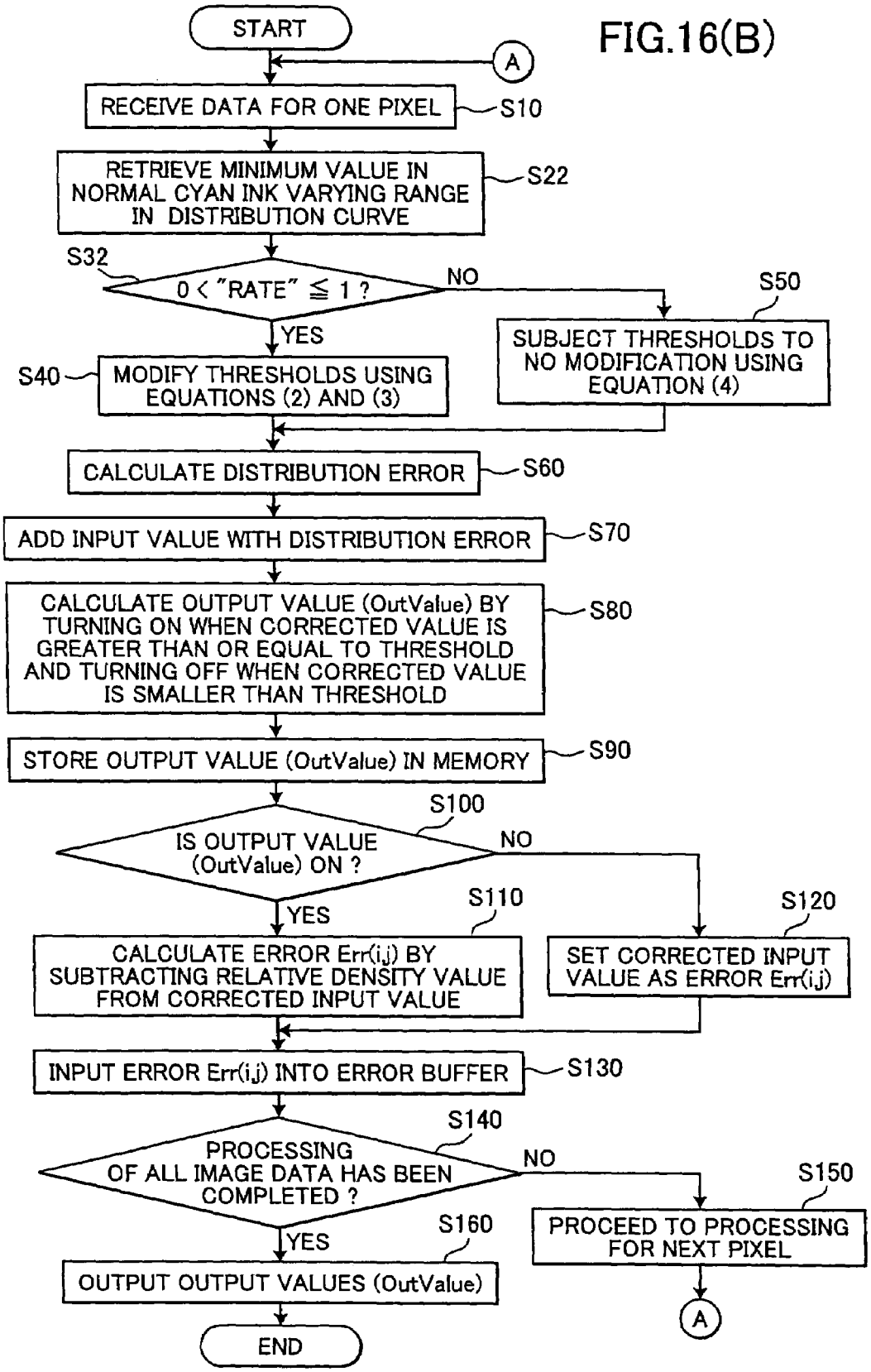
FIG. 16(B) is a flowchart illustrating the error-diffusion multilevel halftone process according to the second embodiment.

According to the present embodiment, the halftone module 99 judges in S22 (FIG. 16(B)) whether or not the value "rate" of equation (6) is greater than zero (0) and smaller than or equal to one (1). In this example, the equation (6) is expressed as "rate"=1−{["input value"−1]/10} because the value "range" in the equation (6) is set to 10 and because the "normal-cyan minimum value in distribution curve" is set to 0 based on the distribution curve DC of FIG. 11. Accordingly, the halftone module 99 determines in S32 whether or not the normal cyan input value Cin is 1 through 10. As apparent from FIG. 11, the level of normal cyan ink data becomes 1 when normal cyan ink is started being mixed with light cyan ink. Accordingly, by judging whether or not the normal cyan input value is 1 through 10, the halftone module 99 can know whether the normal cyan input value is near to the value, at which normal cyan ink is started being mixed with light cyan ink. According to the present embodiment, when the value of the normal cyan input data Cin is near to the value, at which normal cyan ink is started being mixed with light cyan ink, the halftone module 99 adds noise to the threshold values Ta, Tb, and Tc in S40. The noise-added thresholds are used in the comparing process of S80. Accordingly, the halftone module 99 can start increasing its two-bit normal-cyan output value Cout approximately at the same time when its two-bit light-cyan output value Lcout starts being leveled, thereby eliminating the false contour.

In this way, it is confirmed that a false contour can be reduced by adding a noise signal to the thresholds for the normal cyan ink when the normal-cyan input value Cin is around the value, at which normal cyan ink starts being mixed with light cyan ink.

It is additionally confirmed that it is possible to prevent occurrence of false contour quickly and effectively by simply judging whether the value of the normal-cyan input value Cin is near the value, at which normal cyan ink is started being mixed with light cyan ink, and by adding a noise signal to the thresholds for normal cyan when it is judged that the normal-cyan input value Cin is around this value.

Additionally, according to the present embodiment, the "rate" is calculated by the equation (6) and the "noise" is in proportion to the value of "rate" as indicated by equation (3). Accordingly, it is possible to add maximum noise signal to thresholds when the input value Cin is exactly equal to the value "1", at which normal cyan ink starts being mixed with light cyan ink, and to gradually decrease the amount of the noise signal as the value of the normal cyan input value Cin increases.

It was confirmed that false contour is more effectively prevented by adding a maximum noise signal to thresholds when the normal cyan input value Cin is around the value "1", at which normal cyan ink starts being mixed with light cyan ink, and by gradually reducing the noise signal as the value of normal cyan ink Cin increases.

<First Modification of Second Embodiment>

Next will be described a modification of the second embodiment.

According to the present modification, in order to prevent false contours in cyan continuous tone images, the halftone module 99 performs judgment operation only when the halftone module 99 receives light-cyan input data Lcin from the color correction module 98. The halftone module 99 modifies the thresholds for light cyan based on the judged results.

According to this modification, as shown in FIG. 16(A), when the halftone module 99 receives the eight-bit light cyan input data Lcin as an input value Iin, the judging section 99e uses the following equation (7) to calculate the value of "rate" instead of using the equation (6):

$$\text{"rate"}=1-\{[(\text{"light-cyan maximum value in distribution curve"}-1)-\text{"input value"}]/\text{"range"}\} \quad (7)$$

wherein the value "range" is fixed to 10, and the "light-cyan maximum value in distribution curve" is the maximum value in the light-cyan-ink value varying range in the distribution curve DC of FIG. 11. Accordingly, the judging section 99e determines the value of "rate" while referring to the distribution curve DC in the color correction table CT. In this example, as apparent from FIG. 11, the distribution curve DC indicates that the light-cyan value varies in the range of 0 to 51, and therefore the "light-cyan maximum value in distribution curve" in equation (7) is set to 51.

The judging section 99e then judges whether or not the value of "rate" is greater than zero (0) and smaller than or equal to one (1). When the "rate" is greater than zero (0) and smaller than or equal to one (1), the calculating section 99f modifies the thresholds Ta, Tb, and Tc into the modified thresholds Ta', Tb', and Tc' by using the above-described equations (2) and (3). On the other hand, when the "rate" is smaller than or equal to zero (0) or greater than one (1), the calculating section 99f determines the modified thresholds Ta', Tb', and Tc' as being equal to the original thresholds Ta, Tb, and Tc by the equation (4).

In this way, according to the present embodiment, the judgment section 99e performs judgment for each light-cyan input value Lcin by judging whether the value "rate" of formula (7) is greater than zero (0) and smaller than or equal to one (1). In this example, the above-described equation (7) is expressed as "rate"=1−{(50−"input value")/10} because the value "range" in the equation (7) is set to 10 and because the "maximum value" is set to 51 based on the distribution curve DC of FIG. 11. Accordingly, the halftone module 99 determines whether or not the light cyan input value Lcin is 41 through 50. As apparent from FIG. 11, the level of light cyan ink data Lcin becomes 51 when normal cyan ink is started being mixed with light cyan ink. Accordingly, by judging whether or not the light cyan input value Lcin is 41 through 50, the judging section 99e can know whether the light cyan input value Lcin is near to the value, at which normal cyan ink is started being mixed with light cyan ink. According to the present modification, when is the value of the light cyan input data Lcin is near to the value, at which normal cyan ink is started being mixed with light cyan ink, the calculating section 99f adds noise to the threshold values Ta, Tb, and Tc The noise-added thresholds are used in the comparing process. As a result, the halftone module 99 can allow the two-bit light-cyan output value Lcout to start being leveled approximately at the same time when the two-bit normal-cyan output value Cout starts increasing from zero, thereby eliminating the false contour.

FIG. 19 is a flowchart illustrating the error-diffusion multilevel halftone process executed by the halftone module 99 of the present modification.

The error-diffusion multilevel halftone process of the present modification differs from that of the second embodiment in that the processes of S22 and S32 in the second embodiment (FIG. 16(b)) are replaced with processes of S24 and 534.

In S24, the distribution curve DC (FIG. 11) in the color correction table CT is searched, and retrieve the maximum value in the light cyan ink varying range is retrieved. In this example, the maximum value "51" is retrieved.

Then, in S34, the equation (7) is used to calculate the value "rate", and it is judged whether the value "rate" is greater than zero (0) and smaller than or equal to 1.

If the value "rate" is greater than zero (0) and smaller than or equal to 1 (yes in S34), the equations (2) and (3) are used to convert the thresholds Ta–Tc into modified thresholds Ta'–Tc' in S40. On the other hand, if the value "rate" is smaller than or equal to zero (0) or greater than 1 (no in S34), the equation (4) is used to convert the thresholds Ta–Tc into modified thresholds Ta'–Tc' in S50.

The present inventors conducted additional experiments similarly as the second experiments described in the second embodiment. It was confirmed that the false contour can be reduced by adding noise signal to the thresholds for light cyan ink when the light-cyan input value Lcin is around the value, at which normal cyan ink is started being mixed to light cyan ink.

According to the present embodiment, the "rate" is calculated by the formula (7) and the "noise" is in proportion to the value of "rate" as indicated by formula (3). Accordingly, it is possible to add maximum noise signal to thresholds when the light-cyan input value Lcin is exactly equal to the value of "50", at which normal cyan ink starts being mixed with light cyan ink, and to gradually decrease the amount of the noise signal as the value of the light cyan input value Lcin decreases.

It was confirmed that false contour is more effectively prevented by adding a maximum noise signal to thresholds when the light cyan input value Lcin is around the value, at which normal cyan ink starts mixing with light cyan ink, and by gradually reducing the noise signal as the value of light cyan ink Lcin decreases.

<Second Modification of the Second Embodiment>

Nest will be described a second modification of the second embodiment.

According to the present modification, in order to prevent false contours in cyan continuous tone images, the halftone module 99 performs judgment operation both when the halftone module 99 receives normal-cyan input data Cin from the color correction module 98 and when the halftone module 99 receives light-cyan input data Lcin from the color correction module 98. The halftone module 99 modifies the thresholds for normal cyan based on the results judged for normal-cyan input data Cin, and modifies the thresholds for light cyan based on the results judged for light-cyan input data Lcin.

The halftone module 99 of the present modification performs the judgment operation and the threshold-modification operation for normal cyan in the same manner as in the second embodiment, and performs the judgment operation and the threshold-modification operation for light is cyan in the same manner as in the first modification of the second embodiment.

The present inventors executed the experiments similarly as the second experiments described in the second embodiment. It was confirmed that false contour can be reduced by adding noise signals to thresholds for both of light cyan and normal cyan at the point where normal cyan ink is started being mixed with light cyan ink.

Prevention of false contours gas confirmed to be even more remarkable by adding a maximum noise signal to thresholds for both cyan ink and light cyan ink around the point that normal cyan ink starts being mixed with light cyan ink and gradually reducing the noise signal for normal cyan as the value of normal cyan increases, while gradually reducing the noise signal for light cyan as the value of light cyan decreases.

Third Embodiment

Next will be described a third embodiment of the present invention.

As described already, after the light cyan input value Lcin becomes in a substantially level state and before the normal cyan ink starts increasing from zero (0), the printer 22 will output a fixed maximum amount of light cyan ink continuously without outputting normal cyan ink, thereby generating a false contour. Generally, a false contour is generated around a point where the light cyan input value Lcin becomes substantially uniform.

According to the present embodiment, in order to prevent such a false contour, the halftone module 99 in the first modification of the second embodiment (FIG. 16(A) and FIG. 19) is modified in a manner described below.

When the halftone module 99 receives light-cyan input data Lcin from the color correction module 98 as shown in FIG. 16(A), the judging section 99e judges whether or not the light-cyan input value Lcin is near to a value, at which the light cyan input value Lcin becomes substantially uniform. The judging section 99e performs this judgment, while referring to the distribution curve DC of FIG. 11.

More specifically, the judging section 99 uses the following equation (8) to calculate the value of "rate" instead of using equation (7):

"rate"1−{[("light-cyan uniform value in distribution curve"−1)−"input value"]/"range"}         (8)

wherein the value of "range" is set to 10, and the value of "light-cyan uniform value in distribution curve" is a value of light cyan input value, at which the light cyan input value becomes substantially uniform. In this example, as apparent from the distribution curve DC of FIG. 11, when the light cyan input value reaches "51", the light cyan input value starts being substantially uniform at the value of "51". Accordingly, "light-cyan uniform value in distribution curve" in equation (8) is set to 51. The equation (8) is therefore expressed as "rate"1−{(50−"input value")/10}.

In order to calculate the equation (8), the process of S24 in FIG. 19 is modified to retrieve, from the color correction table CT, the value of light cyan input value ("51" in this example), at which the light cyan input value becomes substantially uniform.

The judging section 99e then judges in S34 whether or not the "rate" is greater than zero and smaller than or equal to 1. When the value of "rate" is greater than zero and smaller than or equal to 1, it is known that the light-cyan input value Lcin is near to the value, at which the light cyan input value becomes substantially uniform. When 0<"rate"≦1, therefore, the calculating section 99f converts, in S40, the thresholds Ta, Tb, and Tc for light cyan into the modified thresholds Ta', Tb', and Tc' by using the equations (2) and (3). On the other hand, when the value of "rate" is smaller than or equal to zero and greater than 1, the calculating section 99f converts, in S50, the thresholds Ta, Tb, and Tc for light cyan into the modified thresholds Ta', Tb', and Tc' by using the equation (4).

In this way, according to the present embodiment, when the judging section 99e determines that the light cyan input value Lcin is around the value, at which the light cyan input value Lcin starts being substantially leveled, the calculating section 99f adds a noise to the thresholds for light cyan.

The present inventors confirmed that by adding a noise signal to the thresholds for light cyan around a point at which the light cyan input value becomes substantially uniform, the boundaries between the region formed by light cyan ink only and the region formed by both of light cyan ink and normal cyan ink become difficult to perceive. As a result false contour is reduced.

<Modification of Third Embodiment>

According to the present modification, in order to prevent a false contour that is generated around a point where the light cyan input value becomes substantially uniform, the halftone module 99 in the second embodiment (FIGS. 16(A) and 16(B)) is modified in a manner described below.

When the halftone module 99 receives normal-cyan input data Cin from the color correction module 98 as shown in FIG. 26(A), the judging, section 99e judges whether or not the normal-cyan input value Cin is near to a value, at which the corresponding light cyan input value Lcin becomes substantially uniform. The judging section 99e performs this judgment, while referring to the distribution curve DC of FIG. 11.

More specifically, the judging section 99 uses the following equation (9) to calculate the value of "rate" instead of using equation (6):

"rate"1−{["input value"−("normal-cyan value for light-cyan uniform value in distribution curve")]/"range"}    (9)

wherein the value of "range" is set to 10, and the value of "normal-cyan for light-cyan uniform value in distribution curve" is a value of normal cyan input value, at which the corresponding normal cyan input value becomes substantially uniform. In this example, as apparent from the distribution curve DC of FIG. 11, when the normal cyan input value reaches "1", the corresponding light cyan input value starts being substantially uniform at the value of "51". Accordingly, "normal-cyan value for light-cyan uniform value in distribution curve" in equation (9) is set to 1. The equation (9) is therefore expressed as "rate"=1−{("input value"−1)/10}.

In order to calculate the equation (9), the process of S22 in FIG. 16(B) is modified to retrieve, from the color correction table CT, the value of normal cyan input value ("1" in this example), at which the corresponding light cyan input value becomes substantially uniform.

The judging section 99e then judges in S32 whether or not the "rate" is greater than zero and smaller than or equal to 1. When the value of "rate" is greater than zero and smaller than or equal to 1, it is known that the normal-cyan input value Cin is near to the value, at which the corresponding light cyan input value becomes substantially uniform. When 0<"rate"≦1, therefore, the calculating section 99f converts, in S40, the thresholds Ta, Tb, and Tc for normal cyan into the modified thresholds Ta', Tb', and Tc' by using the equations (2) and (3). On the other hand, when the value of "rate" is smaller than or equal to zero and greater than 1, the calculating section 99f converts, in S50, the thresholds Ta, Tb, and Tc for normal cyan into the modified thresholds Ta', Tb', and Tc' by using the equation (4).

In this way, according to the present embodiment, when the judging section 99e determines that the normal cyan input value Cin is around the value, at which the corresponding light cyan input value starts being substantially leveled, the calculating section 99f adds a noise to the thresholds for normal cyan.

The present inventors confirmed that by adding a noise signal for normal cyan in this manner, the normal cyan output value Cout starts increasing at approximately the same position as the normal cyan input value Cin starts increasing, thereby reducing false contours.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the thresholds Ta, Tb, and Tc are selectively added with noise. However, the noise, defined by the equations (2) and (3) may be multiplied by a value (−1) and then added to the input value Iin. The thus modified input value Iin is corrected by portions of errors distributed from already-processed pixels, and is then compared with the original thresholds Ta, Tb, and Tc. The same effects as those obtained in the embodiments will be obtained.

In the second through third embodiments, the halftone module 99 performs judgment and threshold-modification for light-cyan and/or normal cyan. However, the halftone module 99 may perform the judgment and threshold-modification for light-magenta and/or normal magenta in similar manners as in the second through third embodiments.

In the second through third embodiments, two types of ink, which have the same hue but different densities, are mixed together. However, three or more types of ink, which have the same hue but different densities, may be mixed together. Also in such a case, similarly to the second embodiment, the judgment section 99e may judge whether input data of at least one ink is near to a point where the at least one ink is mixed with another ink, and add noise to the threshold for the at least one ink dependently on the judged results. Similarly to the third embodiment, the judgment section 99e may judge whether input data of at least one ink is near to a point where the at least one ink becomes leveled, and add noise to the threshold for the at least one ink dependently on the judged results. Similarly to the modification of the third embodiment, the judgment section 99e may judge whether input data of at least one ink is near to a point where another ink becomes leveled, and add noise to the threshold for the at least one ink dependently on the judged results.

The first embodiment may be combined with the second through third embodiments. For example, when receiving the input value Iin for yellow and black, the halftone module 99 performs the halftone process as in the first embodiment. When receiving the input value Iin for normal cyan, light cyan, normal magenta, or light magenta, the halftone module 99 performs the halftone process as in the second through third embodiments.

In the above-described embodiments, the halftone module 99 executes the multilevel halftone process by using the plurality of thresholds Ta, Tb, and Tc. However, the halftone module 99 may be modified to execute the bi-level halftone process. In this case, the threshold table ThT stores therein only one threshold T for each of six ink colors. The threshold T is selectively modified according to the results judged by the judging section 99e. The relative density table RT stores therein only two relative density values "255" (forming-dot) and "0" (forming-no-dot) for each of six ink colors. If the corrected input value Iin' is greater than or equal to the modified threshold value T', the output value Iout is turned ON to have a value of one (1) indicative of an output of a dot. The output value Iout is converted into the relative density value "255". If the corrected input value Iin' is smaller than the modified threshold value T', the output value Iout is turned OFF to have a value of zero (0) indicative of an output of no dot. The output value Iout is converted into the relative density value of "0".

In the embodiments described above, the halftone process (halftone module 99) is executed by the CPU 2 provided in the personal computer 90. In this way, the functions for executing the halftone process are implemented as the image processing program 99. The image processing program 99 can be originally stored in a storage medium, such as a CD-ROM, and read into the RAM 4 via the CD-ROM device 8 and executed by the CPU 2. The image processing program 99 can be downloaded from the Internet via the NCU 14 into the hard disk device 10.

What is claimed is:

1. An image processing device, comprising:
    an inputting portion receiving input data indicative of a density value of one color component for one pixel in a desired image;
    a judging unit judging whether or not the density value of the input data is near to a reference value, wherein the density value of the input data is judged to be near to the reference value when a difference between the density value and the reference value is within a predetermined range;
    a threshold storing portion previously storing therein a predetermined threshold;
    a noise adding portion adding a noise to either one of the density value of the input data and the threshold when it is judged that the density value of the input data is near to the reference value;
    a correcting portion correcting the input data by a correction amount that is determined dependently on an error value which is determined at at least one pixel that has been already-processed and that is located adjacent to the subject pixel, thereby converting the input data into corrected data;
    a comparing portion comparing the corrected data with the threshold;
    an outputting portion outputting output data based on the compared results, thereby converting the corrected data into the output data;
    a relative density setting portion setting a relative density value that corresponds to the output data; and
    an error calculating portion calculating an error value for the subject pixel based on a difference between the corrected data and the relative density value.

2. An image processing device as claimed in claim 1, wherein the noise adding portion adds the noise to the input data, the correcting portion correcting the noise-added input data by the correction amount, the comparing portion comparing the corrected data with the threshold.

3. An image processing device as claimed in claim 1, wherein the noise adding portion adds a noise to the threshold, the correcting portion correcting the input data by the correction amount, the comparing portion comparing the corrected data with the noise-added threshold.

4. An image processing device as claimed in claim 1, wherein the amount of the noise is the largest when the density value of the input data is equal to the reference value, the amount of the noise decreasing as a difference between the density value of the input data and the reference value increases.

5. An image processing device as claimed in claim 1, wherein the threshold storing portion previously stores a plurality of different thresholds, the noise adding portion performing, when it is judged that the density value of the input data is near to the reference value, either one of a first noise-adding operation to add a noise to the density value of the input data and a second noise-adding operation to add a noise to each of the plural thresholds, the comparing portion comparing the corrected data with each of the plural thresholds, the outputting portion outputting multilevel output data based on the compared results.

6. An image processing device as claimed in claim 1, further comprising a relative density storage device previously storing a plurality of relative density values in correspondence with a plurality of different color components and with a plurality of different dot-forming states, the relative density setting portion extracting, from the relative density storage device, one relative density value that corresponds to the color component of the input data and to a dot-forming state that corresponds to the output data.

7. An image processing device as claimed in claim 6, wherein the reference value is equal to one-half of a relative density value that corresponds to the color component of the input data and to a predetermined dot-forming state.

8. An image processing device as claimed in claim 7, wherein the judging unit includes:
    an extracting portion extracting, from the relative density storage device, one relative density value that corresponds to the color component of the input data and to the predetermined dot-forming state; and
    a judging portion judging whether or not a difference between the density value of the input data and a one-half of the extracted relative density value is in a predetermined range,
    wherein she noise adding portion adds a noise signal to either one of the density value of the input data and the threshold when the difference is in the predetermined range.

9. An image processing device as claimed in claim 7, wherein the amount of the noise is the largest when the density value of the input data is equal to the one-half of the extracted relative density value, the amount of the noise decreasing as a difference between the density value of the input data and the one-half of the extracted relative density value increases.

10. An image processing device as claimed in claim 1, wherein the inputting portion is capable of receiving both of first input data and second input data for the one pixel, the first input data being indicative of a density value of a first color component and the second input data being indicative of a density value of a second color component, and
    wherein the density value of the second input data is maintained as being equal to a minimum value of zero (0) while the density value of the first input data is smaller than a predetermined maximum value, thereby indicating that only the first color component is to be outputted, the density value of the second input data becoming greater than the minimum value of zero when the density value of the first input data reaching the predetermined maximum value, thereby indicating that the first and second color components start being mixed with each other.

11. An image processing device as claimed in claim 10, wherein the density value of the first input data is maintained as being equal to the predetermined maximum value while the density value of the second input data is greater than the minimum value of zero (0).

12. An image processing device as claimed in claim 10, wherein the first color component is defined by light ink of a predetermined color, and the second color component is defined by normal ink, whose color is the same as that of the light ink and whose density is greater than that of the light ink.

13. An image processing device as claimed in claim 12, wherein the judging unit judges whether or not a difference between the density value of the first input data and the reference value for the first color component is within a predetermined range, the reference value for the first color component being equal to a value obtained by subtracting the value of one (1) from the predetermined maximum value, the noise adding portion adding the noise to either one of the first input data and the threshold for the first input data when the difference between the density value of the first input data and the reference value for the first color component is within the predetermined range.

14. An image processing device as claimed in claim 13, wherein the amount of the noise is the largest when the density value of the first input data is equal to the reference value, the amount of the noise decreasing as the density value of the first input data decreases from the reference value.

15. An image processing device as claimed in claim 12, wherein the judging unit judges whether or not a difference between the density value of the second input data and the reference value for the second color component is within a predetermined range, the reference value for the second color component being equal to a sum of the predetermined minimum value of zero (0) and a value of one (1), the noise adding portion adding the noise to either one of the second input data and the threshold for the second input data when the difference between the density value of the second input data and the reference value for the second color component is within the predetermined range.

16. An image processing device as claimed in claim 15, wherein the amount of the noise is the largest when the density value of the second input data is equal to the reference value, the amount of the noise decreasing as the density value of the second input data increases from the reference value.

17. An image processing device as claimed in claim 1, wherein the inputting portion is capable of receiving both of first input data and second input data for the one pixel, the first input data being indicative of a density value of a first color component and the second input data being indicative of a density value of a second color component, and
wherein the density value of the first input data is maintained as being equal to a predetermined first value while the density value of the second input data is equal to or greater than a predetermined second value.

18. An image processing device as claimed in claim 17, wherein the judging unit judges whether or not a difference between the density value of the first input data and the reference value for the first color component is within a predetermined range, the reference value for the first color component being equal to a value obtained by subtracting the value of one (1) from the predetermined first value, the noise adding portion adding the noise to either one of the first input data and the threshold for the first input data when the difference between the density value of the first input data and the reference value for the first color component is within the predetermined range.

19. Am image processing device as claimed in claim 17, wherein the judging unit judges whether or not a difference between the density value of the second input data and the reference value for the second color component is within a predetermined range, the reference value for the second color component being equal to the predetermined second value, the noise adding portion adding the noise to either one of the second input data and the threshold for the second input data when the difference between the density value of the second input data and the reference value for the second color component is within the predetermined range.

20. An image processing device as claimed in claim 17, wherein the first color component is defined by light ink of a predetermined color, and the second color component is defined by normal ink, whose color is the same as that of the light ink and whose density is greater than that of the light ink.

21. An image processing device for producing image signals indicative of a desired image by processing a plurality of color signals for a plurality of color components, the image processing device comprising:
    a storage device storing a plurality of relative values in correspondence with a plurality of different parameters, the plurality of different parameters including a plurality of color components;
    an input device receiving, as a color signal, an input value indicative of color density at one color component for one pixel constituting a desired image;
    an extracting portion extracting one relative value from the relative value storage device based on a parameter that corresponds to the input value;
    a judging portion judging whether or not the input value is near to a one-half of the extracted relative value, wherein the input value is judged to be near to the one-half of the extracted relative value when a difference between the input value and the one-half of the extracted relative value is within a predetermined range;
    an adding portion adding a noise signal to either one of the input value and a threshold when the input value is near to the one-half of the extracted relative value so as to generate a corrected input data and a modified threshold; and
    a converting portion converting the input value into an output value by comparing the corrected input value with the threshold, and outputting the output value as an image signal.

22. An image processing device as claimed in claim 21, wherein the extracting portion extracting the one relative value that correspond to the color components of the input value.

23. An image processing device for producing image signals indicative of a desired image by processing a plurality of color signals for a plurality of color components, the image processing device comprising:
    an input portion receiving an input value of a first color component of a desired image and an input value of a second color component of the desired image;
    a judging portion performing at least one of: a first judging operation judging whether or not the input value of the first color component indicates a density level near to a predetermined mixing-start-point density level where the first color component starts being mixed with the second color component, and a second judging operation judging whether or not the input value of the second color component indicates a density level near to the predetermined mixing-start-point density level, wherein a density level is indicated as being near to the predetermined mixing-start-point density level when a difference between the density level and the predetermined mixing-start-point density level is within a predetermined range;

an adding portion performing a first noise-adding operation when the judging portion determines that the input value of the first color component indicates a density level near to the predetermined mixing-start-point density level and performing a second noise-adding operation when the judging portion determines that the input value of the second color component indicates a density level near to the predetermined mixing-start-point density level, the first noise-adding operation being for adding a first noise signal to either one of a threshold for the first color component and the input value for the first color component so as to generate a first modified threshold and a corrected input value for the first color component, the second noise-adding operation being for adding a second noise signal to either one of a threshold for the second color component and the input value for the second color component so as to generate a second modified threshold and a corrected input value for the second color component; and a converting portion comparing the corrected input value of the first color component with the first modified threshold, thereby converting the corrected input value of the first color component into an output value of the first color component, and comparing the corrected input value of the second color component with the second modified threshold, thereby converting the corrected input value of the second color component into an output value of the second color component.

24. An image processing device as claimed in claim 23, wherein the first color component has a density smaller then the second color component.

25. An image processing device as claimed in claim 23, wherein the first noise signal is at the maximum when the input value of the first color component is equal to the mixing-start-point density level, and gradually decreases as the input value of the first color component decreases.

26. An image processing device as claimed in claim 23, wherein the second noise signal is at the maximum when the input value of the second color component is equal to the mixing-start-point density level, and gradually decreases as the input value of the second color component increases.

27. An image processing device for producing image signals indicative of a desired image by processing a plurality of color signals for a plurality of color components, the image processing device comprising:

an input portion receiving an input value of a first color component of a desired image;

a judging portion judging whether or not the input value of the first color component indicates a density level near to a predetermined uniform density level, at which the input value of the first color component becomes substantially uniform, wherein the density level is indicated as being near to the predetermined uniform density level when a difference between the density level and the predetermined uniform density level is within a predetermined range, and the input value of the first color component becomes substantially uniform when the input value of the first color component reaches a constant value;

an adding portion adding a first noise signal to either one of the input value of the first color component and a threshold for the input value of the first color component when the judging portion determines that the input value of the first color component indicates a density level near to the predetermined uniform density level; and a converting portion comparing the input value of the first color component with the threshold, thereby converting the input value of the first color component into an output value of the first color component.

28. An image processing device for producing image signals indicative of a desired image by processing a plurality of color signals for a plurality of color components, the image processing device comprising:

an input portion receiving an input value of a first color component of a desired image and an input value of a second color component of the desired image;

a judging portion judging whether or not the input value of the second color component indicates that the input value of the first color component has a density level near to a predetermined uniform density level, at which the input value of the first color component becomes substantially uniform, wherein the density level is indicated as being near to the predetermined uniform density level when a difference between the density level and the predetermined uniform density level is within a predetermined range, and the input value of the first color component becomes substantially uniform when the input value of the first color component reaches a constant value;

an adding portion adding a noise signal to either one of the input value of the second color component and a threshold for the input value of the second color component when the judging portion determines that the input value of the second color component indicates that the input value of the first color component has the density level near to the predetermined uniform density level; and a converting portion comparing the input value of the second color component with the corresponding threshold, thereby converting the input value of the second color component into an output value of the second color component.

29. An image processing device as claimed in claim 28, wherein the first color component has a density smaller than the second color component.

30. A computer-readable medium encoded with a computer program for being executed by a computer to process an image, the program comprising:

instructions for receiving input data indicative of a density value of one color component for one pixel in a desired image;

instructions for judging whether or not the density value of the input data is near to a reference value, wherein the density value of the input data is judged to be near to the reference value when a difference between the density value and the reference value is within a predetermined range;

instructions for adding a noise to either one of the density value of the input data and a threshold when it is judged that the density value of the input data is near to the reference value;

instructions for correcting the input data by a correction amount that is determined dependently on an error value which is determined at at least one pixel that has been already-processed and that is located near to the subject pixel, thereby converting the input data into corrected data;

instructions for comparing the corrected data with the threshold;

instructions for outputting output data based on the compared results, thereby converting the corrected data into the output data;

instructions for setting a relative density value that corresponds to the output data; and instructions for calculating an error value for the subject pixel based on a difference between the corrected data and the relative density value.

* * * * *